(12) United States Patent
Wayne et al.

(10) Patent No.: US 9,716,296 B2
(45) Date of Patent: Jul. 25, 2017

(54) THERMAL SOLUTION FOR PRISMATIC LITHIUM ION BATTERY PACK

(75) Inventors: Ryan J. Wayne, Brecksville, OH (US); Jonathan Andrew Taylor, Houston, PA (US); Julian Norley, Chagrin Falls, OH (US); Bradley E. Reis, Westlake, OH (US); Mark Pollock, Avon, OH (US); Ian Andrew McCallum, Chagrin Falls, OH (US); Thomas W. Weber, Cleveland, OH (US); Robert A. Reynolds, III, Bay Village, OH (US); Martin David Smalc, Parma, OH (US); Elliot G. Fishman, Pittsburgh, PA (US)

(73) Assignee: Advanced Energy Technologies LLC, Lakewood, OH (US)

( * ) Notice: Subject to any disclaimer, the term of this patent is extended or adjusted under 35 U.S.C. 154(b) by 0 days.

(21) Appl. No.: 13/699,415

(22) PCT Filed: May 23, 2011

(86) PCT No.: PCT/US2011/037549
§ 371 (c)(1),
(2), (4) Date: Jan. 14, 2013

(87) PCT Pub. No.: WO2011/146919
PCT Pub. Date: Nov. 24, 2011

(65) Prior Publication Data
US 2013/0115506 A1 May 9, 2013

Related U.S. Application Data

(60) Provisional application No. 61/346,942, filed on May 21, 2010, provisional application No. 61/376,555, (Continued)

(51) Int. Cl.
*H01M 10/52* (2006.01)
*H01M 10/655* (2014.01)
(Continued)

(52) U.S. Cl.
CPC ..... *H01M 10/5044* (2013.01); *H01M 10/613* (2015.04); *H01M 10/617* (2015.04);
(Continued)

(58) Field of Classification Search
CPC  F28D 7/00; F28D 21/00; H01M 2/02; H01M 2/14; H01M 6/00; H01M 10/00;
(Continued)

(56) References Cited

U.S. PATENT DOCUMENTS 3,404,061 A   10/1968   Russell et al.
5,071,652 A   12/1991   Jones et al.
(Continued)

FOREIGN PATENT DOCUMENTS

DE   102008041547 A1 *   3/2010
EP       0704919 A1       4/1996
(Continued)

OTHER PUBLICATIONS

Machine Translation of JP 2003-297303 A (English).*
(Continued)

*Primary Examiner* — Patrick Ryan
*Assistant Examiner* — Carmen Lyles-Irving

(57) ABSTRACT

A lithium ion battery pack includes a plurality of prismatic lithium polymer cells and one or more graphite heat spreaders. Each spreader has at least two major surfaces and is made of one of a sheet of a compressed mass of exfoliated graphite particles, a graphitized polyimide sheet, or combinations thereof.

7 Claims, 19 Drawing Sheets

Related U.S. Application Data filed on Aug. 24, 2010, provisional application No. 61/410,956, filed on Nov. 8, 2010, provisional application No. 61/476,079, filed on Apr. 15, 2011.

(51) Int. Cl.

| | | |
|---|---|---|
| *H01M 10/647* | (2014.01) | |
| *H01M 10/6556* | (2014.01) | |
| *H01M 10/6551* | (2014.01) | |
| *H01M 10/652* | (2014.01) | |
| *H01M 10/6557* | (2014.01) | |
| *H01M 10/6567* | (2014.01) | |
| *H01M 10/6552* | (2014.01) | |
| *H01M 10/6555* | (2014.01) | |
| *H01M 10/617* | (2014.01) | |
| *H01M 10/613* | (2014.01) | |

(52) U.S. Cl.
CPC ....... *H01M 10/647* (2015.04); *H01M 10/652* (2015.04); *H01M 10/655* (2015.04); *H01M 10/6551* (2015.04); *H01M 10/6552* (2015.04); *H01M 10/6555* (2015.04); *H01M 10/6556* (2015.04); *H01M 10/6557* (2015.04); *H01M 10/6567* (2015.04)

(58) Field of Classification Search
CPC ............. H01M 10/50; H01M 10/5044; H01M 10/647; H01M 10/6556; H01M 10/6551; H01M 10/652; H01M 10/6557; H01M 10/6567; H01M 10/6552; H01M 10/6555; H01M 10/617; H01M 10/655; H01M 10/613
USPC ....... 429/120, 149, 152, 153, 162, 247, 434, 429/435, 437; 165/46, 56, 80.2, 80.4, 165/136, 185; 361/688, 704, 708, 709, 361/710
See application file for complete search history.

(56) References Cited

U.S. PATENT DOCUMENTS

| | | |
|---|---|---|
| 5,091,025 A | 2/1992 | Murakami |
| 5,354,630 A | 10/1994 | Earl et al. |
| 5,885,728 A | 3/1999 | Mercuri et al. |
| 6,117,584 A | 9/2000 | Hoffman et al. |
| 6,709,783 B2 | 3/2004 | Ogata et al. |
| 6,821,671 B2 | 11/2004 | Hinton et al. |
| 6,982,874 B2 | 1/2006 | Smalc |
| 6,998,193 B2 | 2/2006 | Sun |
| 7,292,441 B2 * | 11/2007 | Smalc et al. .................. 361/704 |
| 2005/0089750 A1 | 4/2005 | Ng |
| 2005/0123835 A1 | 6/2005 | Sun |
| 2006/0134514 A1 * | 6/2006 | Lenain et al. ................ 429/120 |
| 2009/0142628 A1 | 6/2009 | Okada |
| 2010/0276132 A1 * | 11/2010 | Payne ........................... 165/169 |
| 2011/0195290 A1 | 8/2011 | Koenigsmann |
| 2013/0209858 A1 | 8/2013 | Schmitt et al. |

FOREIGN PATENT DOCUMENTS

| | | | |
|---|---|---|---|
| EP | 1742524 | | 1/2007 |
| JP | 2001229897 | | 8/2001 |
| JP | 2003297303 A | * | 10/2003 |
| JP | 2006-196230 A | * | 7/2006 |
| JP | 2006196230 A | * | 7/2006 |
| WO | 2010/005435 A1 | | 1/2010 |

OTHER PUBLICATIONS

Machine Translation of JP 2006-196230 A (English).*
JP 2006-196230—English Machine Translation (AIPN).*
JP 2006-196230 (STIC Human Translation).*
Written Opinion of the International Search Authority for PCT/US2011/037549, dated Nov. 27, 2012.

* cited by examiner

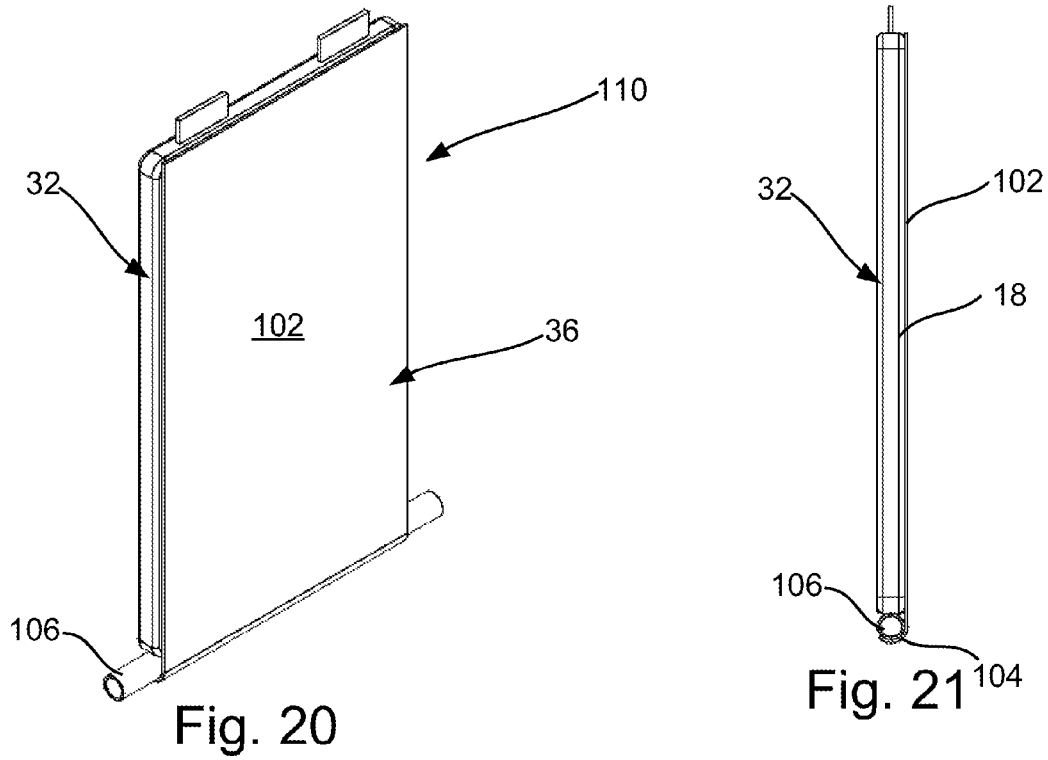
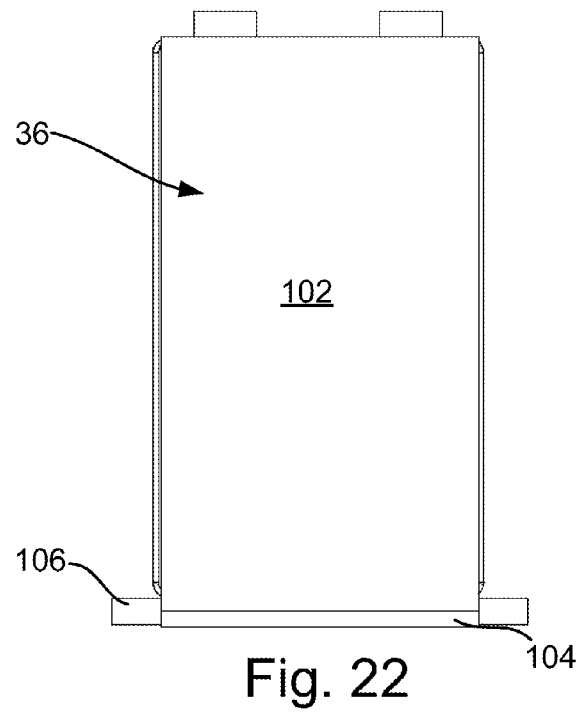

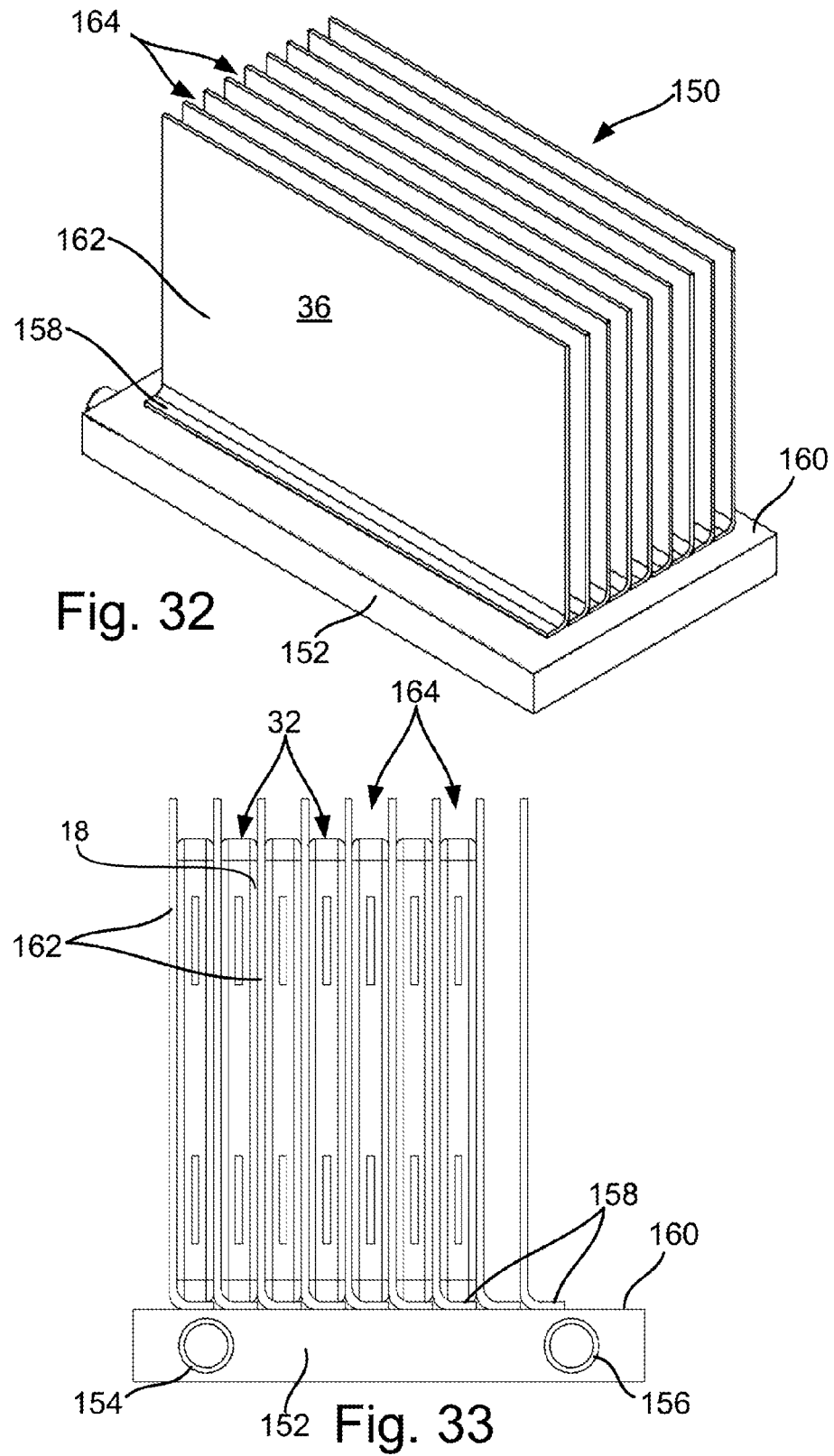

THERMAL SOLUTION FOR PRISMATIC LITHIUM ION BATTERY PACK

RELATED APPLICATIONS

This application is the national stage of PCT/US11/037549 filed on May 23, 2011 and entitled, Thermal Solution for Prismatic Lithium Ion Battery Pack, claims priority to US Provisional Patent Application Numbers 61/346,942 filed on May 21, 2010; 61/376,555 filed on Aug. 24, 2010; and 61/410,956 filed on Nov. 8, 2010, the contents of which are hereby incorporated by reference.

TECHNICAL FIELD

This disclosure relates generally to battery packs and electrochemical cells with high energy density and their use in items of manufacture such as electrically powered automobiles.

BACKGROUND

Motor vehicles, such as, for example, hybrid vehicles, use multiple propulsion systems to provide motive power. This most commonly refers to gasoline-electric hybrid vehicles, which use gasoline (petrol) to power internal-combustion engines (ICEs), and electric batteries to power electric motors. These hybrid vehicles recharge their batteries by capturing kinetic energy via regenerative braking. When cruising or idling, some of the output of the combustion engine is fed to a generator (typically the electric motor(s) running in generator mode), which produces electricity to charge the batteries. This contrasts with all-electric cars which use batteries charged by an external source such as the grid, or a range extending trailer. Nearly all hybrid vehicles still require gasoline as their sole fuel source though diesel or other fuels such as ethanol or plant based oils have also seen occasional use.

Batteries and cells are important energy storage devices well known in the art. The batteries and cells typically comprise electrodes and an ion conducting electrolyte positioned therebetween. Battery packs that contain lithium ion batteries are increasingly popular for automotive applications and various commercial electronic devices because they are rechargeable and have no memory effect. Storing and operating the lithium ion battery at an optimal operating temperature is very important to allow the battery to maintain a charge for an extended period of time.

Due to the characteristics of the lithium ion batteries, the battery pack operates within an ambient temperature range of −20° C. to 60° C. However, even when operating within this temperature range, the battery pack may begin to lose its capacity or ability to change or discharge should the ambient temperature fall below 0° C. Depending on the ambient temperature, the life cycle capacity or charge/discharge capability of the battery may be greatly reduced as the temperature strays from 0° C. Nonetheless, it may be unavoidable that the lithium ion battery be used where the ambient temperature falls outside the temperature range.

Alluding to the above, significant temperature variances can occur from one cell to the next, which is detrimental to performance of the battery pack. To promote long life of the entire battery pack, the cells must be below a desired threshold temperature. To promote peak performance, the differential temperature between the cells in the battery pack should be minimized. However, depending on the thermal path to ambient, different cells will reach different temperatures during charge and discharge operations. Accordingly, if one cell is at an increased temperature with respect to the other cells, its charge or discharge efficiency will be different, and, therefore, it may charge or discharge faster than the other cells. This leads to a decline in the performance of the entire pack.

Therefore, there remains an opportunity to improve upon prior packs of lithium batteries to increase the ambient temperature range at which the lithium battery operates and to provide a new battery pack with improved packaging characteristics. Likewise, there remains an opportunity to maintain the battery pack at the optimal operating temperature to ensure the longest possible life cycle, rated capacity, and nominal charge and discharge rates.

SUMMARY OF THE INVENTION

According to one aspect of the invention, a lithium ion battery pack includes a plurality of prismatic lithium polymer cells, a first heat sink in thermal communication with one or more of the plurality of cells, and at least two graphite heat spreaders. Each spreader has at least two major surfaces, wherein each heat spreader is at least one of a sheet of a compressed mass exfoliated graphite particles, a graphitized polyimide sheet, or combinations thereof. Each heat spreader is in thermal communication with the heat sink and each heat spreader has an in-plane thermal conductivity of greater than about 300 W/mK at about room temperature and having a major surface in contact with at least one of the lithium polymer cells.

According to another aspect of the invention, a lithium ion battery pack includes a plurality of prismatic lithium polymer cells and a first heat sink in thermal communication with one or more of the plurality of cells. For every pair of polymer cells at least one graphite heat spreader is in thermal communication with each cell of the pair. Each spreader has at least two major surfaces, and each heat spreader is at least one of a sheet of a compressed mass exfoliated graphite particles, a graphitized polyimide sheet and combinations thereof. Each heat spreader is in thermal communication with the heat sink, a sufficient amount of the heat spreaders having an in-plane thermal conductivity greater than the in-plane thermal conductivity of an aluminum sheet at about 25° C., thereby reducing the weight of the pack as compared to the pack having heat spreaders made from aluminum.

According to another aspect of the invention, a lithium ion battery pack includes a plurality of cell stacks, each cell stack being positioned adjacent to at least one other cell stack. Each stack has a plurality of prismatic lithium polymer cells, each prismatic lithium polymer cell includes two opposed major surfaces. At least one graphite heat spreader has at least two major surfaces and an in-plane thermal conductivity of greater than about 300 W/mK at about room temperature, the heat spreader being at least one of a sheet of a compressed mass of exfoliated graphite particles, a graphitized polyimide sheet, or combinations thereof. The heat spreader is in thermal contact with one of the major surface of each of two adjacent cells within the stack, the heat spreader further contacts the major surface of one or more cells in one or more adjacent stacks.

According to yet another aspect of the invention, a lithium ion battery pack includes a plurality of battery cells arranged in a stack having a center and opposed ends. At least one graphite heat spreader has a generally U-shaped portion in cross-section and a first leg, a second leg and a third leg. The first leg is positioned between adjacent battery cells in the stack, the third leg is positioned adjacent at least one battery cell in the stack. The first leg being positioned closer to the center than the third leg, and the second leg connecting the first leg to the second leg. Each spreader has at least two major surfaces, wherein each heat spreader is at least one of a sheet of a compressed mass exfoliated graphite particles, a graphitized polyimide sheet, or combinations thereof. Each heat spreader has an in-plane thermal conductivity of greater than about 300 W/mK at about room temperature.

According to still another aspect of the invention, a lithium ion battery pack includes a plurality of prismatic lithium polymer cells arranged in a stack having a center and a pair of opposed ends and t least two graphite heat spreaders. Each heat spreader includes a portion that extends beyond the stack, and each spreader has at least two major surfaces. Each heat spreader is at least one of a sheet of a compressed mass of exfoliated graphite particles, a graphitized polyimide sheet, or combinations thereof, and each heat spreader has an in-plane thermal conductivity of greater than about 300 W/mK at about room temperature and at least one of the major surfaces is in contact with at least one of the lithium polymer cells. The portions positioned relatively closer to the center extend further from the stack than the portions positioned relatively further from the center.

According to still another aspect of the invention, a thermal management assembly for a battery cell having opposed major surfaces is provided. The thermal management assembly includes a flexible graphite heat spreader having two opposed major surface faces and an in-plane thermal conductivity of at least 250 W/m-K and a first conduit through which a fluid flows. At least one of the two opposed major surface faces of the flexible graphite heat spreader contacts at least a portion of one of the opposed major surfaces of the cell and also at least a portion of an outer surface of the first conduit.

According to another aspect of the invention, a thermal management assembly for a battery cell having opposed major surfaces is provided. The thermal management assembly includes a generally U-shaped hollow frame sized to carry a cell therein and a flexible graphite heat spreader having two opposed major surface faces and an in-plane thermal conductivity of at least 250 W/m-K. A first conduit through which a fluid flows is in fluid communication with the hollow frame. At least one of the two opposed major surface faces of the flexible graphite heat spreader contacts at least a portion of one of the opposed major surfaces of the cell and also at least a portion of the hollow frame.

According to another aspect of the invention, a thermal management assembly for a battery cell having opposed major surfaces is provided. The thermal management assembly includes a cold plate through which a fluid medium is directed, a plurality of generally L-shaped flexible graphite heat spreaders, each having an upstanding leg extending upwardly from the cold plate and a contact leg parallel too, and in thermal contact with a top surface of the cold plate. The flexible graphite heat spreader has an in-plane thermal conductivity of at least 250 W/m-K and the upstanding legs form gaps therebetween. The cells are received in the gaps.

According to still another aspect of the invention, a thermal management assembly for a battery cell having opposed major surfaces is provided. The thermal management assembly includes a pair of spaced parallel conduits through which a thermal transfer medium is directed, a mounting plate having a body portion sized the same as or larger than a major surface of the cell and an extension on opposed sides of the body. Each extension includes an aperture that receives one of the spaced parallel conduits. A flexible graphite heat spreader is secured to the mounting plate and interposed between the mounting plate and the cell, the flexible graphite heat spreader having an in-plane thermal conductivity of at least 250 W/m-K.

It is to be understood that both the foregoing general description and the following detailed description provide embodiments of the invention and are intended to provide an overview or framework of understanding and nature and character of the invention as it is claimed. The accompanying drawings are included to provide a further understanding of the invention and are incorporated in and constitute a part of the specification. The drawings illustrate various embodiments of the invention and together with the description serve to describe the principles and operations of the invention.

BRIEF DESCRIPTION OF THE DRAWINGS

FIG. 20 is an isometric view of another embodiment of a battery pack having a generally J-shaped heat spreader and a conduit.

FIG. 21 is a side view of the battery pack of FIG. 20.

FIG. 22 is a front view of the battery pack of FIG. 20.

FIG. 32 is an isometric view of another embodiment of a battery pack having a plurality of spaced generally L-shaped heat spreaders and a cold plate.

FIG. 33 is a side view of the battery pack of FIG. 32.

DETAILED DESCRIPTION

Figure 1:
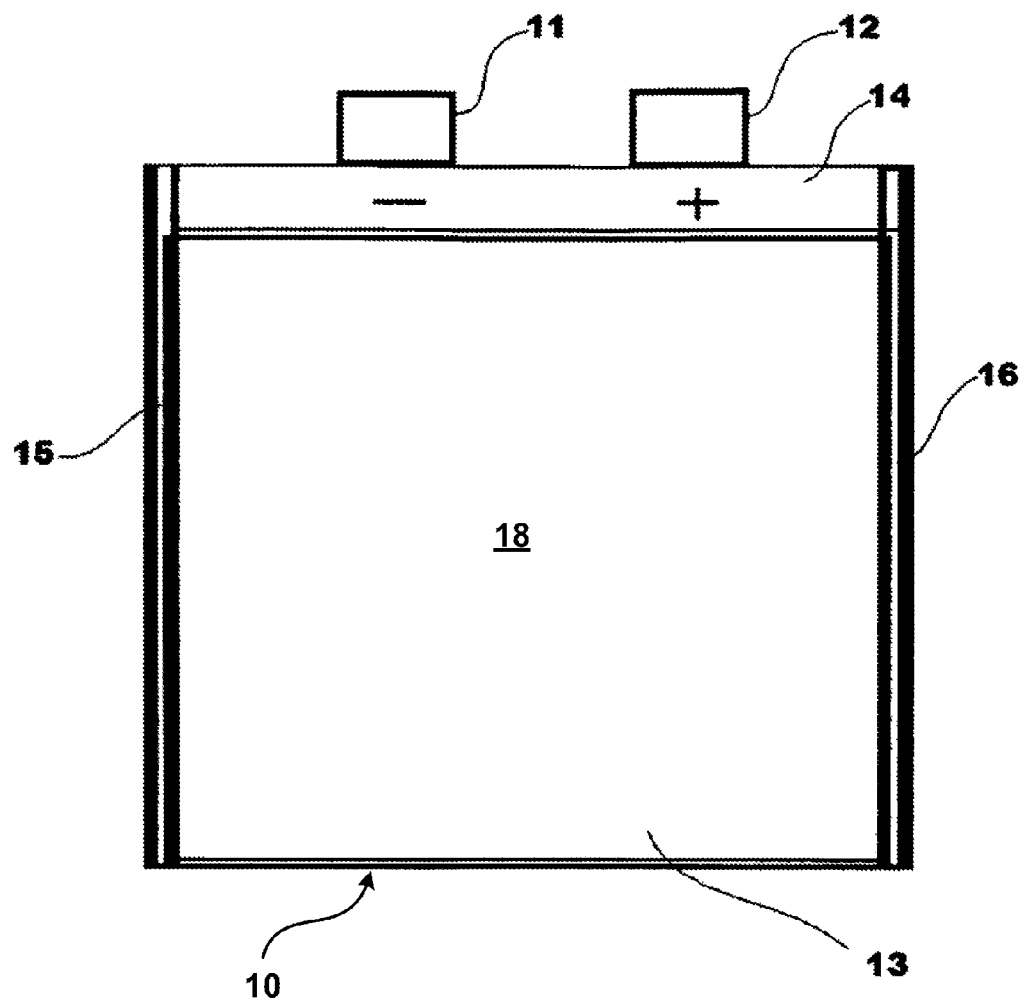
FIG. 1 is top plan view of a large format prismatic lithium-ion cell.

The battery pack and the large format prismatic lithium-ion cells have certain advantages over conventional prismatic or cylindrical cells. They have not only higher energy density, but also substantially lower possibility of battery failure due to a "hot" cell problem when the cells are used for assembling multi-cell battery packs.

The battery or battery pack is made by assembling several large format prismatic lithium-ion cells in series to add up voltage, or in parallel to increase capacity. For instance, when two lithium-ion cells, each having a 3.7V and a capacity of 4.5V, are assembled together in series, the resulting battery has a doubled voltage (7.2V) and a same capacity of 4.5 Ah. If these two cells are assembled in parallel, the resulting battery has a double capacity (9.0 Ah) and a same voltage of 3.7V.

In one embodiment of the battery pack, the large format prismatic lithium-ion cell has a major surface footprint of at least 16 square inches, more preferably a footprint of at least 25 square inches or at least 36 square inches, even more preferably a footprint of at least 49 square inches or at least about 400 square inches, even more preferably a footprint of from about 16 square inches to about 2500 square inches and the most preferably a footprint of from about 400 square inches to about 1600 square inches.

The case of each battery cell may be made of a hardened metal and/or plastic casing. Alternately, the case may be aluminum foil-laminated plastic film. The positive electrode is a lithium-ion positive electrode, the negative electrode is a lithium-ion negative electrode and the electrolyte is a lithium-ion electrolyte. More preferably, the electrolyte is a liquid lithium-ion electrolyte or a polymer lithium-ion electrolyte.

The negative electrode is typically made of carbon material such as coke, MCMB, or graphite. The positive electrode can be made of lithium compounds such as $LiCoO_2$, $LiNiO_2$, $LiMn_2O_4$, $LiFePO_4$, and $LiCo_xNi_{1-x}O_2$ wherein the x is from 0.1 to 0.9. However, any electrode materials known in the art can be used herein.

The liquid lithium-ion electrolyte is preferably a non-aqueous electrolyte, which usually comprises: (1) an electrolyte salt, and (2) a non-aqueous solvent. Examples of these electrolyte salts include $LiPF_6$, $LiBF_4$, $LiAsF_6$, $LiCl_4$, $LiN(SO_2CF_3)_2$, lithium perfluoro-sulfonates. Examples of non-aqueous solvent is include ethylene carbonate "EC", propylene carbonate "PC", diethyl carbonate "DEC", dimethyl carbonate "DMC", ethyl methyl carbonate "EMC", α-butyrolactone "α.-BL", methyl acetate "MA", methyl formate "MF", and dimethyl ether "DME", and solvents described in U.S. Publication No. 2005/0123835 (patent application Ser. No. 10/731,268), the contents of which are incorporated herein by reference to the extent permitted.

The positive electrode and the negative electrode are separated by at least one micro-porous membrane as described in U.S. Pat. No. 6,998,193, the contents of which are incorporated herein by reference.

In one embodiment, the large format prismatic lithium-ion cell is generally rectangular or square shaped and has a thickness of from about 1 mm to about 10 mm. More preferably, the cell has a thickness of from about 3 mm to about 6 mm. Preferably, the large format lithium-ion cell has a specific energy density of greater than 200 wh/kg, more preferably greater than 210 wh/kg and the most preferably about 220 wh/kg or greater.

In yet another embodiment, the large format lithium-ion cell has an energy density of at least 450 wh/L, preferably at least 500 wh/L, more preferably at least 510 wh/L and most preferably at least 520 wh/L.

In still another embodiment, the large format lithium-ion battery pack has an energy storage capacity of at least 16 kWh, preferably at least 24 kWh, more preferably at least 53 kWh and most preferably at least 100 kWh.

In one embodiment, the battery packs are used to power an electric vehicle to an extended driving range of at least 40 miles per charge with the battery packs accounting for about 10% to about 50% of the total weight of the electric vehicle; in a further embodiment at least 15% of the total weight. In a certain embodiment, the driving range of the electric vehicle is extended to at least 300 miles per charge or at least 350 miles per charge. More preferably, the driving range of the electric vehicle is extended to at least about 400 miles per charge or at least about 450 miles per charge. Even more preferably the driving range of the electric vehicle is extended to at least about 500 miles per charge or at least about 550 miles per charge. Even more preferably, the driving range of the electric vehicle is extended to at least about 600 miles per charge or at least about 650 miles per charge.

As used herein, the term "cell" or "battery cell" means an electrochemical cell made of at least one positive electrode, at least one negative electrode, an electrolyte, and a separator membrane. The term "cell" and "battery cell" are used interchangeably. The "battery" or "battery pack" means an electric storage device made of more than two cells. The terms "battery" and "battery pack" are used interchangeably.

The battery cell case is preferably made with aluminum foil-laminated plastic film, which has a thickness of from about 20 μm to about 200 μm. More preferably, the aluminum foil-laminated plastic film has a thickness of from about 30 μm to about 100 μm. Most preferably, aluminum foil-laminated plastic film has a thickness of from about 40 μm to about 50 μm.

An important utility for the large format prismatic lithium-ion cell is in the assembly of large battery packs to be used as the power source for applications such as electric vehicles (EV), hybrid electric vehicles (HEV), plug-in HEV (PHEV), and standby power stations used in load leveling, peak shaving and grid energy storage applications.

Large format prismatic cells offer high energy density and have the advantage of less battery (pack) failure due to a "hot cell". A battery pack is usually assembled with many cells electrically connected in series as well as in parallel. If one cell has a problem such as lower capacity or higher internal resistance, the whole battery pack becomes bad and may no longer be used. The problem cell is the so-called "hot cell".

Large format prismatic cells are typically assembled into battery packs in a stacked configuration, wherein the major surfaces of each cell are facing the major surfaces of each adjoining cell. This stacked arrangement maximizes the energy density, but is not conducive to transferring the heat generated during operation away from the cells. This is particularly true of the interior cells of the battery pack located relatively far from one of the exterior surfaces of the battery pack. To facilitate heat transfer, thermally conducting sheets or plates "heat spreaders" can be inserted in the spaces between the stacked prismatic cells. The heat spreaders ensure high performance and long life of the cells by reducing thermal gradients in the plane of the sheet and transporting heat directly to the surroundings of the pack or to an external heat sink.

The following embodiments are given as specific illustrations of the battery packs contemplated herein. It should be understood, however, that the invention is not limited to the specific details set forth in the examples. All parts and percentages in the examples, as well as in the remainder of the specification, are by weight unless otherwise specified.

Further, any range of numbers recited in the specification or paragraphs hereinafter describing or claiming various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. The term "about" when used as a modifier for, or in conjunction with, a variable, is intended to convey that the numbers and ranges disclosed herein are flexible and that practice of the present invention by those skilled in the art using temperatures, concentrations, amounts, contents, carbon numbers, and properties that are outside of the range or different from a single value, will achieve the desired result.

An embodiment of a large format prismatic lithium-ion cell may be assembled using a graphite negative electrode, a $LiCoO_2$ positive electrode, and a bondable separator membrane. A non-aqueous electrolyte may be injected into the assembled battery case. Both negative and positive electrodes may be conventional liquid lithium-ion battery electrodes, namely negative and positive materials which are double-side coated onto copper and aluminum foil respectively, the carbon negative electrode containing about 90% graphite active material, the $LiCoO_2$ positive electrode containing about 91% active material.

With reference now to FIG. 1, a large format prismatic lithium-ion cell is generally indicated by the numeral 10. Cell 10 may be assembled by, for example, a) wrapping seven positive electrode pieces with a bondable separator membrane, b) stacking the wrapped positive electrodes with eight negative electrode pieces starting with a negative electrode piece on the bottom, then a positive electrode, and alternating pieces, ending with the $8^{th}$ negative electrode on top.

The resulting stacked cell assembly may then be subjected to a heat-activation step by pressing at 100° C. under a pressure of 109 psi for 3 minutes. After such a "dry-press" step, separator membranes may be bound onto electrodes firmly and the cell assembly may become a stiff single piece.

The negative electrode leads may be welded to a negative cell terminal 11 made of copper foil. The positive electrode leads may be welded to a positive cell terminal 12, which is made of aluminum foil.

The cell assembly may then be packaged in a cold-formed battery cell case 13. Case 13 may be made with aluminum foil-laminated plastic film, such as produced by Dai Nippon Printing Co. of Shinjuku-ku, Tokyo, Japan. The terminal side 14 and one adjacent side 15 of the cell case is then sealed using a heat sealer. After the cell was fully dried, it is transferred into a dry-box under nitrogen atmosphere. Substantially about 14 g of electrolyte is injected into the cell. The cell is finally hermetically sealed by heat-sealing the last open side 16, rested for one day, and then subjected to charge/discharge cycle test. The charge/discharge cycle test is conducted using a Battery Tester Model Series 4000 manufactured by Maccor Inc. of Tulsa, Okla. Though major surface 18 is generally square, it should be appreciated that it may be other shapes, such as rectangular.

Figure 2:
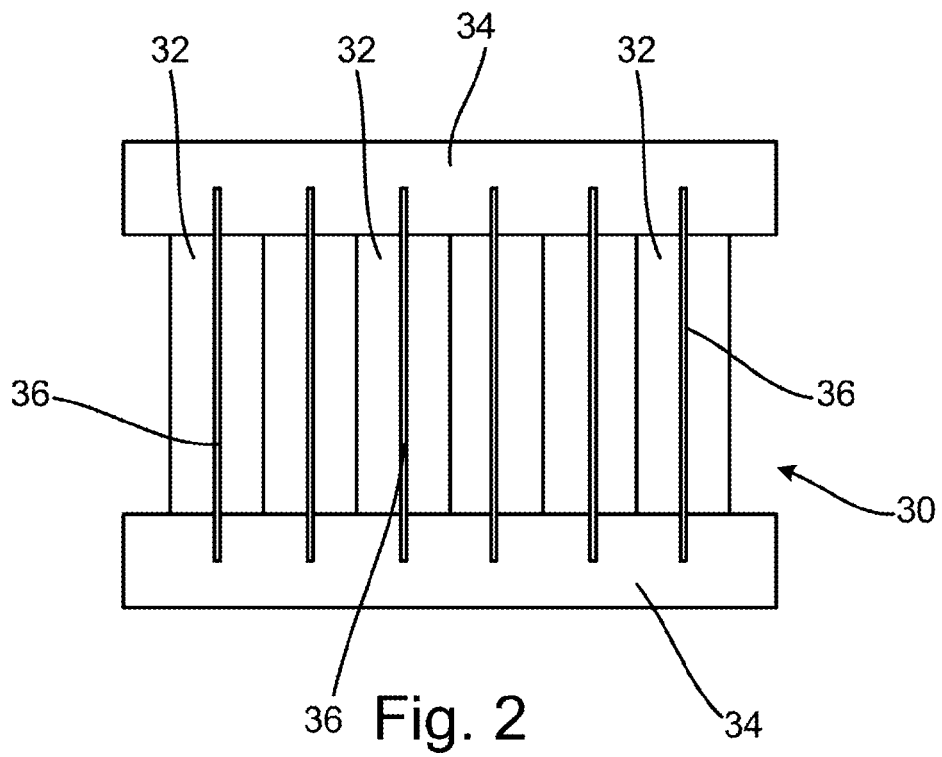
FIG. 2. is a side view of a battery pack made in accordance with the present invention.

In the following embodiments, like numerals indicate like elements. With reference to FIG. 2, an embodiment of Li-ion battery pack assembly is shown and generally indicated by the numeral 30. Pack 30 includes a plurality of prismatic lithium polymer cells 32 arranged in a stacked configuration. Interspersed between every-other cell 32 is a heat spreader 36. Thus, according to the present embodiment, a heat spreader contacts at least one major surface of each cell 32. A first heat sink 34a may be in thermal communication with one or more of the plurality of cells 32 and further, with at least one of the heat spreaders 36. A second heat sink 34b is positioned on the opposed side of the cell stack from the first heat sink 34a. Second heat sink 34b may in thermal communication with one or more of the plurality of cells 32, and further, with at least one of the heat spreaders 36. Though in the present embodiment, heat spreader 36 is positioned between every-other cell 32, it should be appreciated that, heat spreaders 36 may be positioned in other arrangements. For example, heat spreader 36 may be positioned between each cell 32. Further, heat spreader 36 could be positioned at one or both ends of the cell stack.

Heat sink 34 may be actively cooled by the use of a fluid. In one embodiment heat sink 34 is liquid cooled. If so desired, heat sink 34 may be used to apply heat to pack 30. This may be accomplished by circulating a fluid that is warmer than ambient temperature within sink 34.

Figure 3:
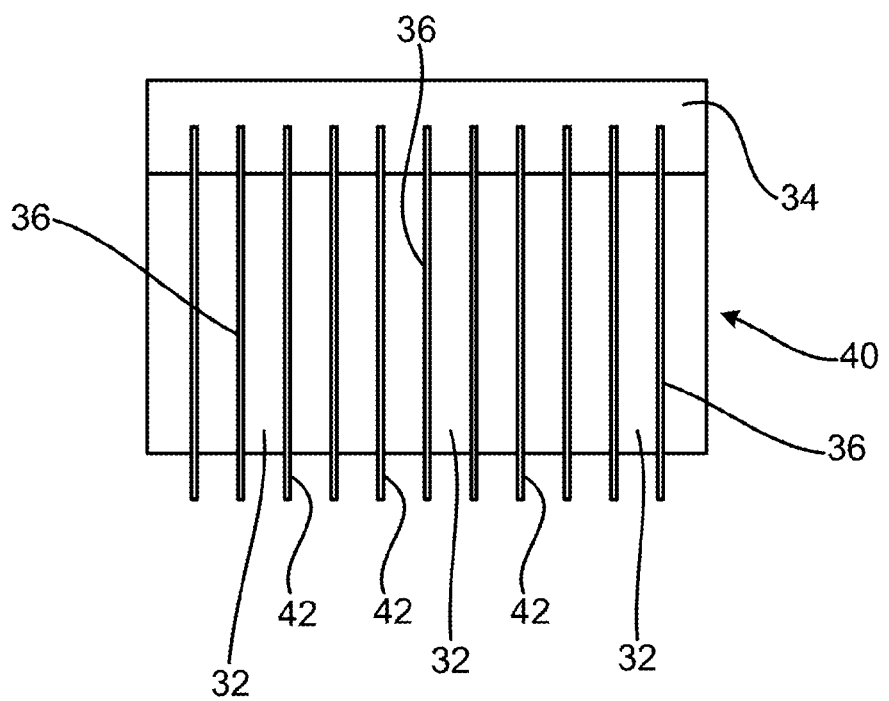
FIG. 3. is a side view of another embodiment of the battery pack wherein a heat-sink is provided on only one side thereof.

With reference now to FIG. 3, an alternate embodiment of Li-ion battery pack assembly is shown and generally indicated by the numeral 40. As can be seen, pack 40 is substantially similar to pack 30 except that pack 40 includes only one heat sink 34. Further, a heat spreader 36 is positioned between each cell 32. As can be seen, each heat spreader 36 includes a portion 42 that extends outwardly from the cell stack on the side opposed from heat sink 34. Thus, a heat spreader 36 contacts the major surface of two adjacent cells 32 within a stack, and additionally extends beyond the cell stack in a direction other than toward the heat sink 34.

Figure 4:
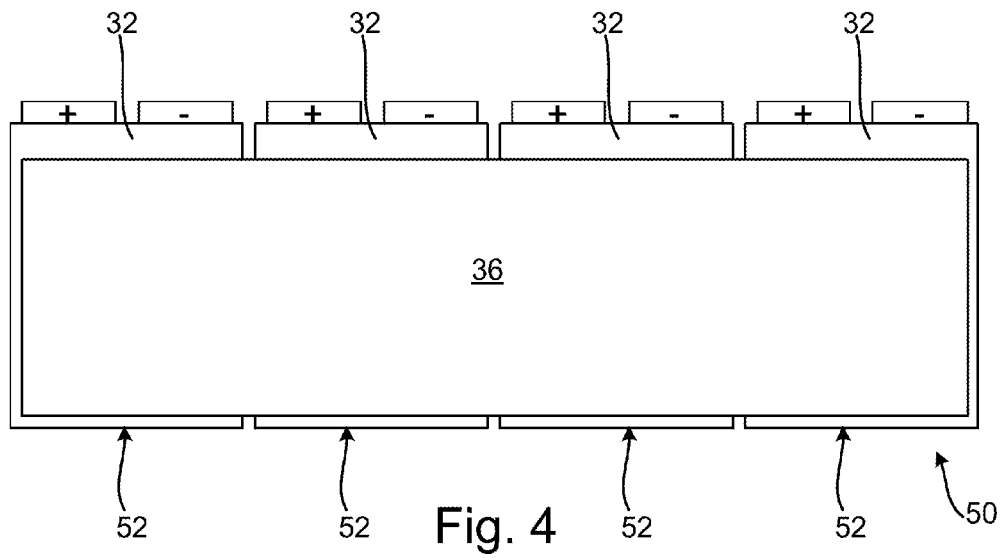
FIG. 4. is a top view of another embodiment of the battery pack including a plurality of adjacent cell stacks.
Figure 5:
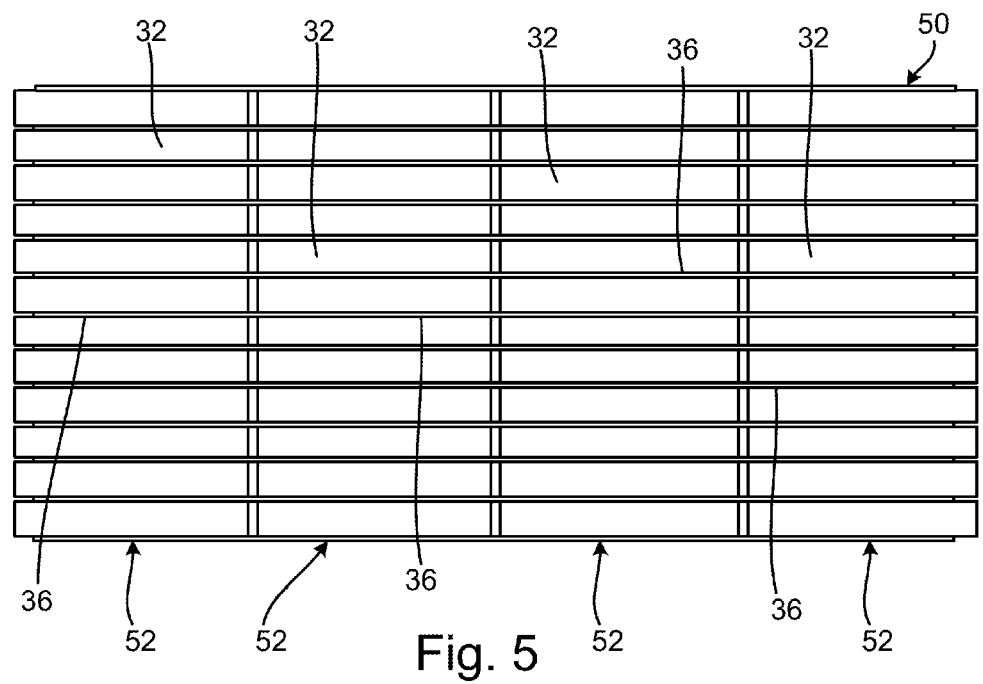
FIG. 5 is a side view of the battery pack of FIG. 4.

With reference now to FIGS. 4 and 5, another embodiment of the Li-ion battery pack assembly is shown and generally indicated by the numeral 50. Battery pack 50 includes a plurality of cells 32 arranged in a plurality of adjacent stacks 52. Though the present embodiment shows four stacks 52 having twelve cells 32, it should be appreciated that, according to the present embodiment, any number of stacks may be employed. Furthermore, any number of cells may be employed in each stack. In one embodiment, the number of cells in each stack is even. In this or other embodiments, the same number of cells is included in each stack. Interspersed between each adjacent cell 32 in a stack 52 is a heat spreader 36. Heat spreader 36 extends to, and is in thermal contact with each stack 52. Thus, according to the present embodiment, a heat spreader contacts the major surface of two adjacent cells 32 within a stack, as well as the major surface of cells 32 in one or more adjacent stacks. In the embodiment shown in FIGS. 4 and 5, though no heat sink is provided, it should be appreciated that a heat sink may be included in the manner shown in FIGS. 2 and 3.

Though in the present embodiment, a heat spreader 36 is positioned between each cell 32 in a stack 52, it should be appreciated that, heat spreaders 36 may be positioned in other arrangements. For example, heat spreader 36 may be positioned between every-other cell 32 in a stack 52. Further, though a heat spreader 36 is shown positioned at both ends of the cell stacks 52, it should be appreciated that a heat spreader 36 could be positioned at only one, or at neither end of the stacks 52.

Figure 6:
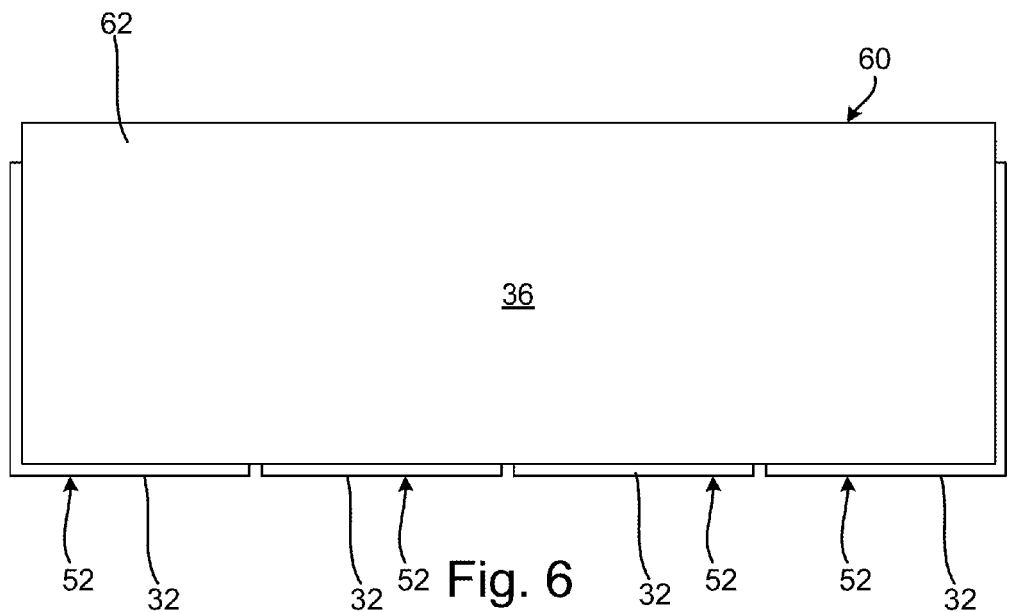
FIG. 6 is a top view of another embodiment of the battery pack including a plurality of adjacent cell stacks, wherein the one or more heat spreaders extends outwardly from at least one edge of the cell stacks.
Figure 7:
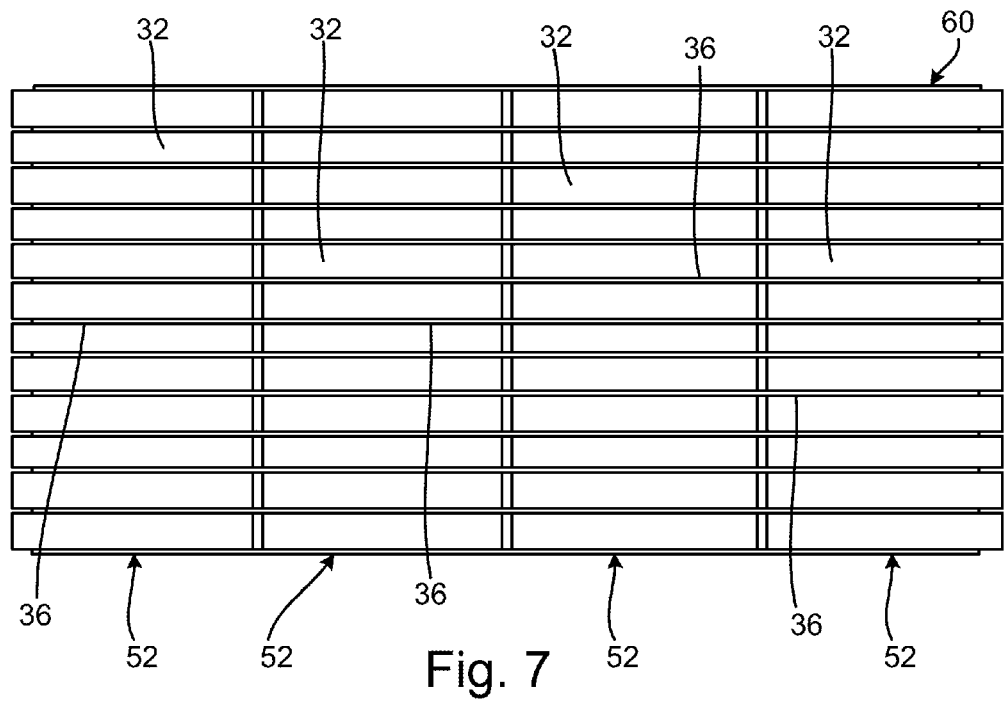
FIG. 7 is a side view of the battery pack of FIG. 6.

With reference now to FIGS. 6 and 7, another embodiment of the Li-ion battery pack assembly is shown and generally indicated by the numeral 60. As can be seen, battery pack 60 is substantially similar to battery pack 50 except that a portion 62 of each heat spreader 36 extends outwardly beyond each stack 52. In one or more embodiments, the portion 62 extends outwardly at least 5 mm from the edge of the stack 52. In other embodiments the portion 62 extends out at least 10 mm from the stack 52. In still other embodiments the portion 62 extends out at least 20 mm from the stack. In still other embodiments, the portion 62 extends out at least 50 mm from the stack. Thus, a heat spreader 36 contacts the major surface of two adjacent cells 32 within a stack, the major surface of cells 32 in one or more adjacent stacks 52, and additionally extends beyond the stack 52 in a direction other than toward an adjacent stack. In this manner, improved heat removal and spreading is possible. For improved heat removal, convective cooling may be enabled using this arrangement by causing air to flow over portion(s) 62.

Figure 8:
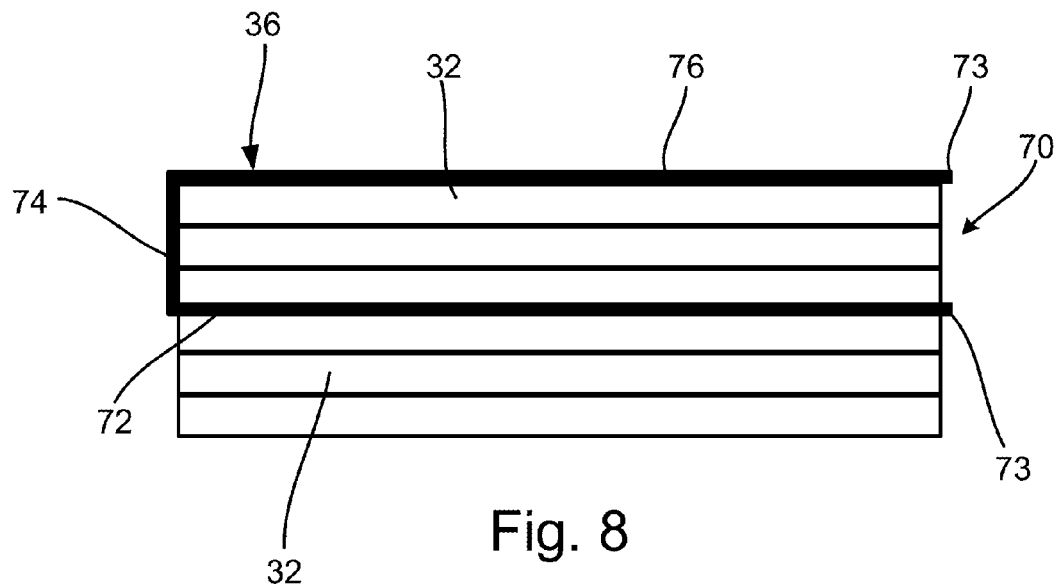
FIG. 8 is a side view of another embodiment of the battery pack including a generally U-shaped heat spreader.
Figure 9:
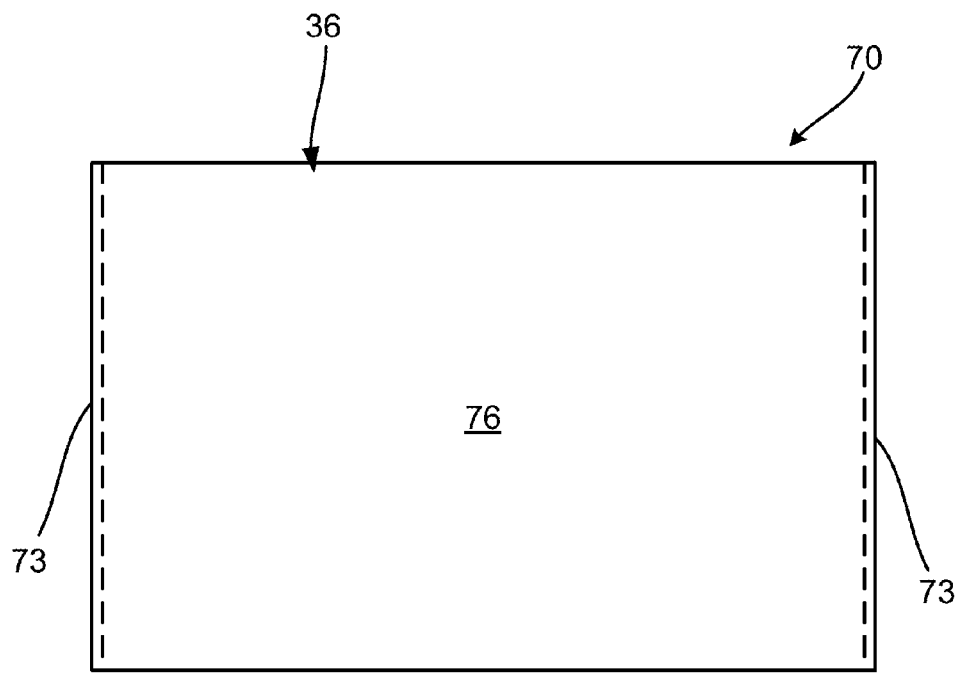
FIG. 9 is a top view of the battery pack of FIG. 8.

With reference now to FIGS. 8 and 9, an embodiment of Li-ion battery pack assembly is shown and generally indicated by the numeral 70. Pack 70 includes a plurality of prismatic lithium polymer cells 32 arranged in a stacked configuration. A heat spreader 36 is arranged in a generally U-shaped configuration in cross-section. Accordingly, heat spreader 36 includes three legs. A first leg 72 is positioned between the opposed major surfaces of two adjacent cells 32. In one embodiment, first leg 72 is sized to contact at least half of the opposed major surfaces of the two adjacent cells. In one embodiment, the first leg 72 is sized to contact substantially all of the opposed major surfaces of the two adjacent cells. In one embodiment, the two adjacent cells 32 are the most central (i.e. most interior) pair of cells. In other words, for example, if the stack included six cells 32, in one embodiment first leg 72 may be positioned between the $3^{rd}$ and $4^{th}$ cell.

A second leg 74 extends from first leg 72 and runs along and/or is generally proximate to the side of pack 70 and extends to one end of the pack 70. In one embodiment, second leg 74 is generally perpendicular to first leg 72. A third leg 76 is connected to second leg and extends along the exterior facing major surface of one of the cells 32 at an exterior end of pack 70. In one embodiment, third leg 76 extends generally perpendicular from second leg 74. In one embodiment, the third leg contacts a substantial portion of the exterior facing major surface of the one of the cells 32 at an exterior end of pack 70. It should be appreciated that, though FIG. 8 shows the third leg extending along the exterior facing major surface of the end cell, third leg 76 could instead extend between the opposed major surfaces of two opposed cells 32, wherein the cells 32 are located relatively closer to one end of the cell stack than to the center of the stack. In this manner, thermal energy may be transferred passively from a more central location (relatively hotter) in the cell stack to a peripheral location (relatively cooler), to balance the temperature profile across a cell stack.

A portion 73 of legs 72 and 76 may extend outwardly beyond each stack on the end of the leg opposed from second leg 74. In one or more embodiments, the portion 73 extends outwardly at least 5 mm from the edge of the stack. In other embodiments the portion 73 extends out at least 10 mm from the stack 52. In still other embodiments the portion 73 extends out at least 20 mm from the stack. In still other embodiments, the portion 73 extends out at least 50 mm from the stack.

In one embodiment, first, second and third legs 72, 74 and 76 of heat spreader 36 are made of a single contiguous sheet. In embodiments wherein the legs are made of a contiguous sheet, the radius at the junction between legs 72 and 74 and at the junction between legs 74 and 76 is preferably less than 1 cm. In other embodiments, the radius is less than 1 mm.

Figure 10:
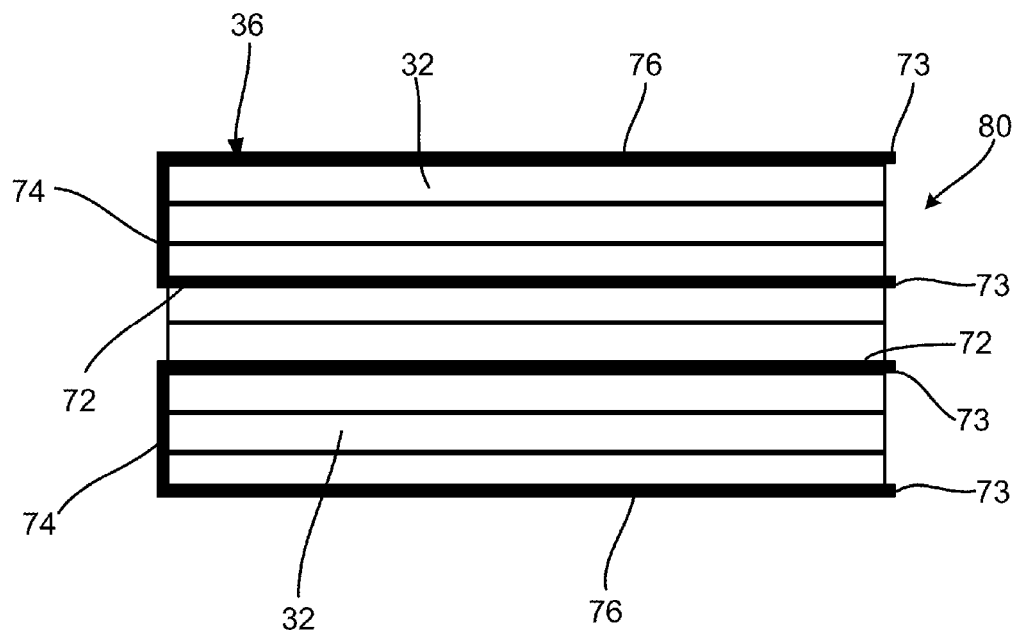
FIG. 10 is a side view of another embodiment of the battery pack including a plurality of generally U-shaped heat spreaders.
Figure 11:
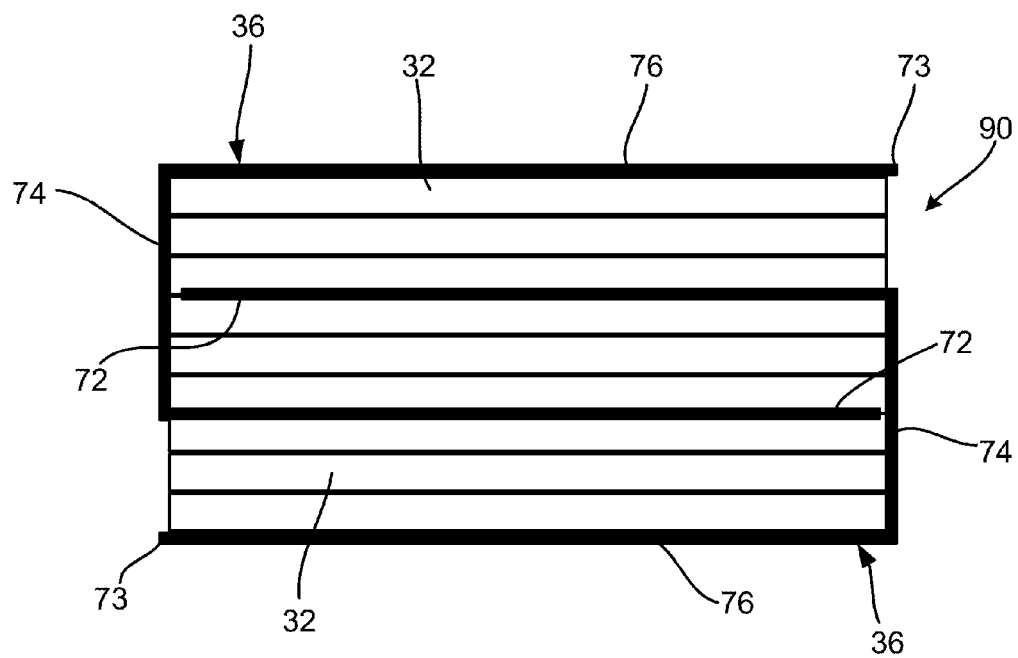
FIG. 11 is a side view of another embodiment of the battery pack including a plurality of generally U-shaped heat spreaders.

With reference now to FIG. 10, where like numbers indicate like elements, a battery pack is shown and generally indicated by the numeral 80. Battery pack 80 includes a pair of U-shaped heat spreaders 36 positioned at opposed ends of the cell stack. In this manner thermal energy may be distributed from the interior cells 32 of the stack to the exterior cells 32 at both ends of the cell stack. FIG. 11 shows a battery pack 90, where like numerals indicated like elements. As can be seen, U-shaped heat spreaders 36 are positioned on opposed sides of the cell stack. Further, each heat spreader 36 is positioned so that the third leg 76 is at opposed ends of cell stack. Second legs 74 are sized so that first legs 72 of each U-shaped heat spreader is positioned between the first and third legs 72 and 76 of the other U-shaped heat spreader. In other words, second legs 74 of each heat spreader 36 have a length that is greater than half the length of the cell stack.

Figure 12:
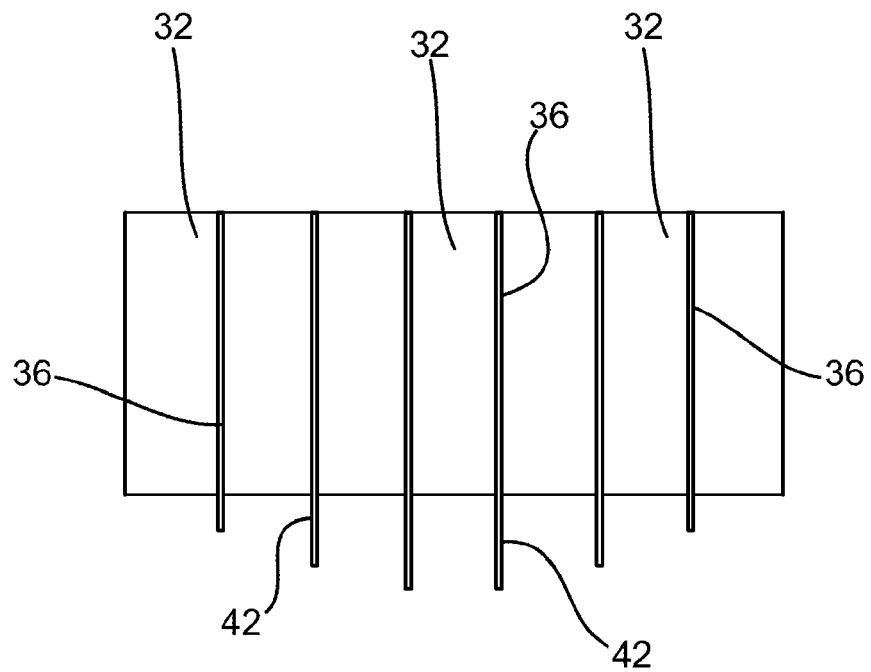
FIG. 12 is a side view of another embodiment of the battery pack including heat spreaders with variably sized extending portions to equalize heat across the cell stack.
Figure 13:
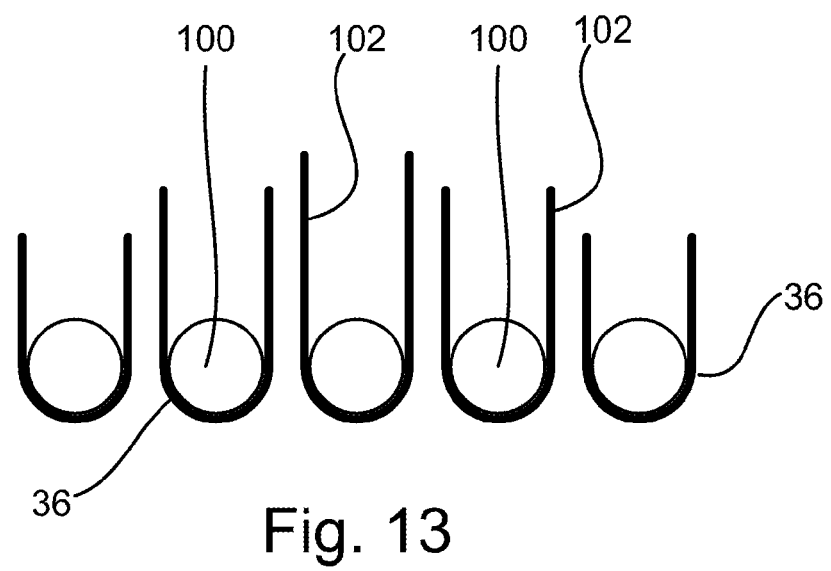
FIG. 13 is a side view of another embodiment of a battery pack having variably sized extending portions to equalize heat across a row of battery cells.

With reference now to FIG. 12, an additional embodiment is shown which passively equalizes the temperature of battery cells within a stack. As can be seen, heat spreaders 36 are positioned between the stacked cells 32. In one embodiment, each heat spreader 36 includes a portion 42 that extends outwardly from the cell stack. In this or other embodiments, the portion 42 of the heat spreaders 36 positioned proximate to the center of the cell stack is longer (i.e. extends further from the stack) than the portion 42 of the heat spreaders 36 positioned proximate to the ends of the cell stack. In these or other embodiments, the length of portion 42 may change linearly as a function of distance from the center of the cell stack. In other embodiments, the length of portion 42 may vary non-linearly (e.g. logarithmic or power function) as a function of distance from the center of the stack. A fan or other convection causing device may be used in conjunction herewith to increase thermal dissipation. As should be appreciated, by using longer portions 42 at the hotter center cells (thereby dissipating relatively more heat) and shorter portions 42 proximate to the exterior of the cell stack, the overall temperature profile across the cell stack may be passively equalized. This approach is applicable to non-prismatic batteries as well, as shown in FIG. 13. As can be seen, a plurality of cylindrical batteries 100 arranged in a row may each be partially wrapped with a heat spreader 36. In one embodiment, the heat spreader 36 contacts half the outer cylindrical surface of each cylindrical battery. Each heat spreader 36 includes a portion 102 that extends away from the cylindrical battery. In this or other embodiments, the portion 102 of the heat spreaders 36 positioned proximate to the center of the row is longer (i.e. extends further from the cylindrical battery) than the portion 102 of the heat spreaders 36 positioned proximate to the ends of the row.

Figure 14:
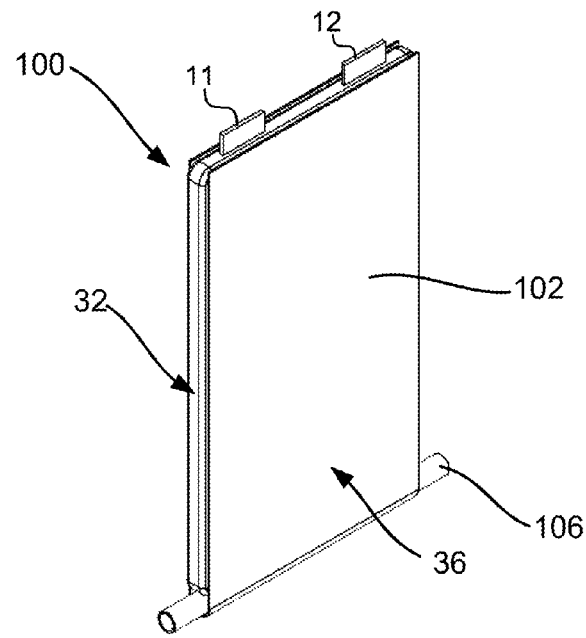
FIG. 14 is an isometric view of another embodiment of a battery pack having a generally U-shaped heat spreader and a conduit.
Figure 15:
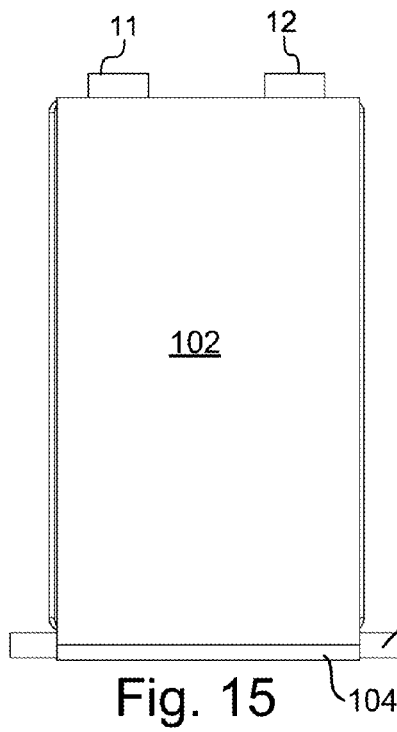
FIG. 15 is a front view of the battery pack of FIG. 14.
Figure 16:
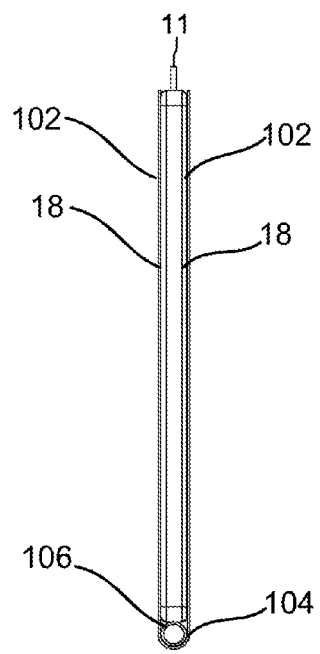
FIG. 16 is a side view of the battery pack of FIG. 14.

With reference now to FIGS. 14-16, where like numbers indicate like elements, a battery assembly is shown and generally indicated by the numeral 100. Battery assembly 100 includes a cell 32 and a generally U-shaped heat spreader 36. Heat spreader 36 includes two legs 102 that are each in thermal contact with the opposed major surfaces 18 of cell 32. Advantageously, legs 102 are in thermal contact with at least about 50% of the surface area of major surfaces 18. More advantageously, legs 102 are in thermal contact with at least about 75% of the surface area of major surfaces 18. Still more advantageously, legs are in thermal contact with substantially all of the surface area of major surfaces 18.

A curved connecting portion 104 joins legs 102 proximate to the end of cell 32 opposed from terminals 11/12. A conduit 106 is positioned between the curved connecting portion 104 and cell 32 and is in thermal contact with curved connecting portion 104. Conduit 106 advantageously is made of a thermally conductive material, for example, a metal such as aluminum or copper. As can be seen, the inner radius of curved connecting portion 104 generally matches the outer radius of conduit 106 to establish good thermal contact therebetween. In this manner, thermal energy may be transferred between the major surfaces 18 and the conduit 106 via the legs 102 and curved connecting portion 104.

Any fluid medium may be directed through conduit 106 to either cool or heat cell(s) 32. In one embodiment, the fluid is a liquid. In this or other embodiments, the fluid medium may be water, however, it should be appreciated that other fluid mediums may be employed. For example, the fluid medium may be ethylene glycol based or propylene glycol based.

Figure 17:
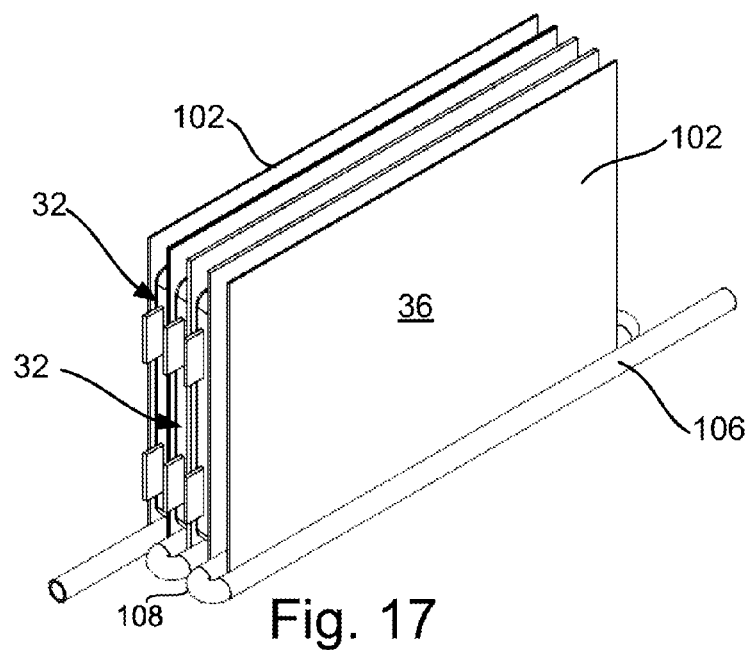
FIG. 17 is an isometric view of another embodiment of a battery pack having a plurality of U-shaped heat spreaders and a serpentine conduit.
Figure 18:
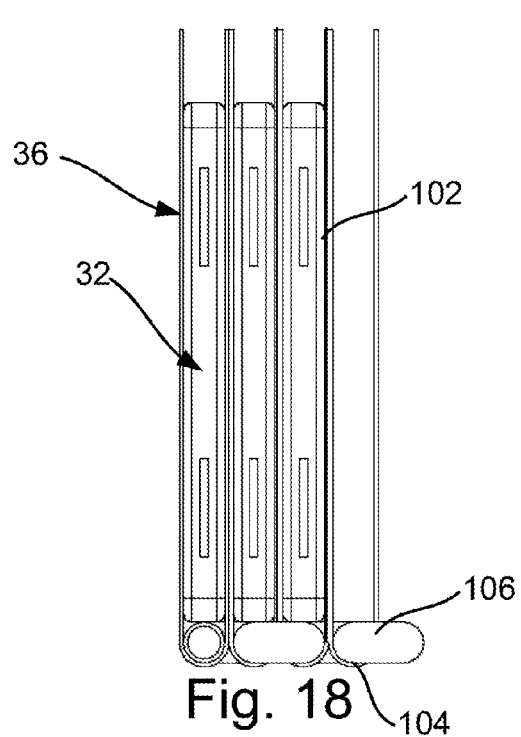
FIG. 18 is a front view of the battery pack of FIG. 17.
Figure 19:
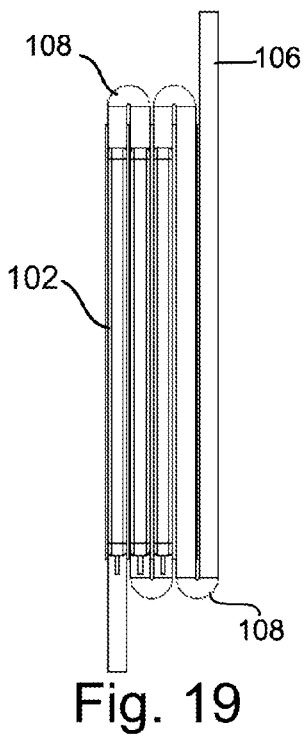
FIG. 19 is a top view of the battery pack of FIG. 17.

With reference now to FIGS. 17-19, it can be seen how the battery assembly 100 may be arranged in a stacked configuration including multiple battery cells 32 are arranged so that the major surfaces are facing one another. The conduit 106 may be arranged in a serpentine configuration so that each switch-back 108 in the serpentine conduit passes through one curved connecting portion 104.

With reference now to FIGS. 20-22, another embodiment of the battery assembly is shown and generally indicated by the numeral 110. As can be seen, battery pack 110 is substantially similar to battery assembly 100 except that only one leg 102 is provided, contacting only one major surface 18 of battery cell 32, and thus the heat spreader 36 is generally J-shaped.

Figure 23:
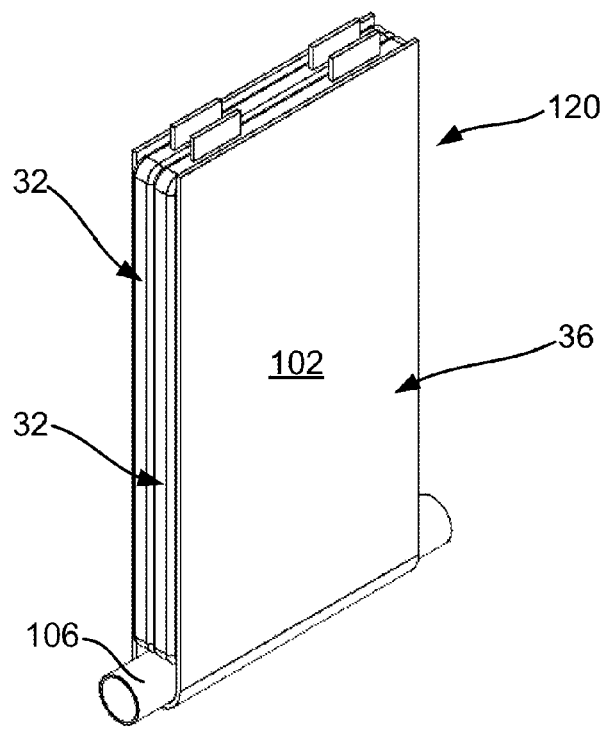
FIG. 23 is an isometric view of another embodiment of a battery pack having a generally U-shaped heat spreader with a plurality of cells positioned between the opposed legs of the U-shaped heat spreader.
Figure 24:
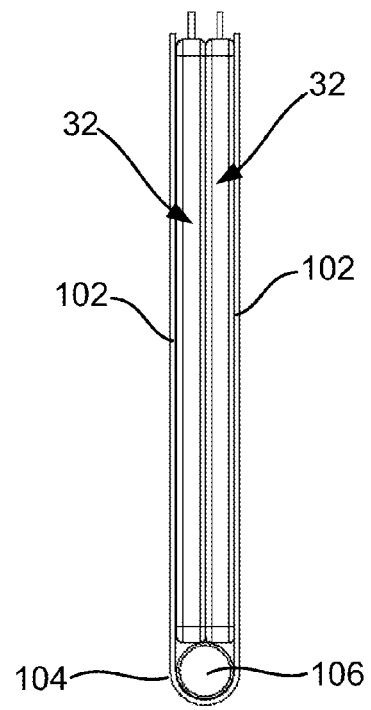
FIG. 24 is a side view of the battery pack of FIG. 23.
Figure 25:
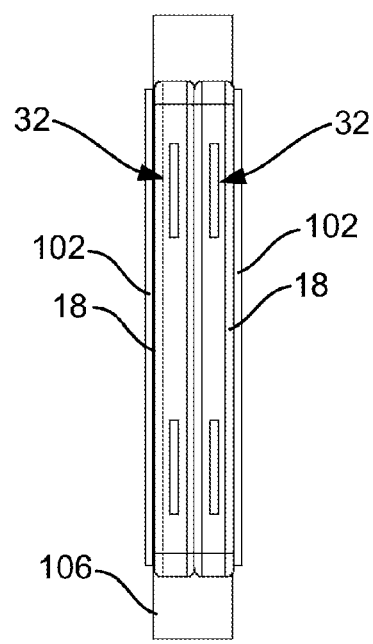
FIG. 25 is a top view of the battery pack of FIG. 23.

With reference now to FIGS. 23-25, another embodiment of a battery pack assembly is shown and generally indicated by the numeral 120. As can be seen, battery pack 120 is substantially similar to battery assembly 100 except that two battery cells 32 are positioned between the opposed legs 102 of heat spreader 36. In this manner one major surface 18 on each cell 32 contacts one opposed leg 102.

Figure 26:
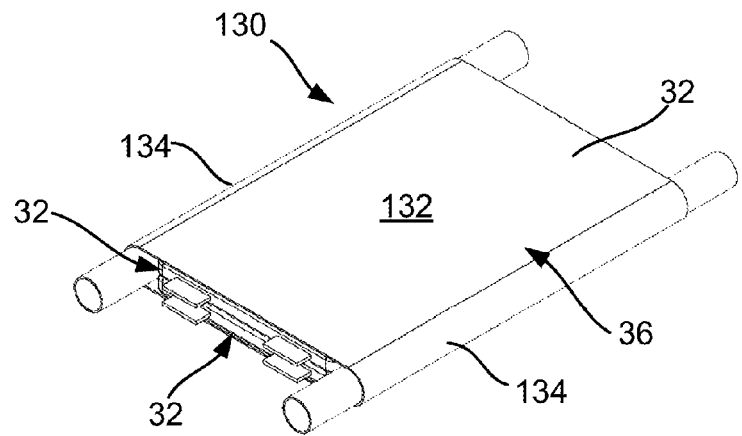
FIG. 26 is an isometric view of another embodiment of a battery pack having a conduit on opposed sides of a cell stack and a heat spreader encompassing the battery cells and conduits.
Figure 27:
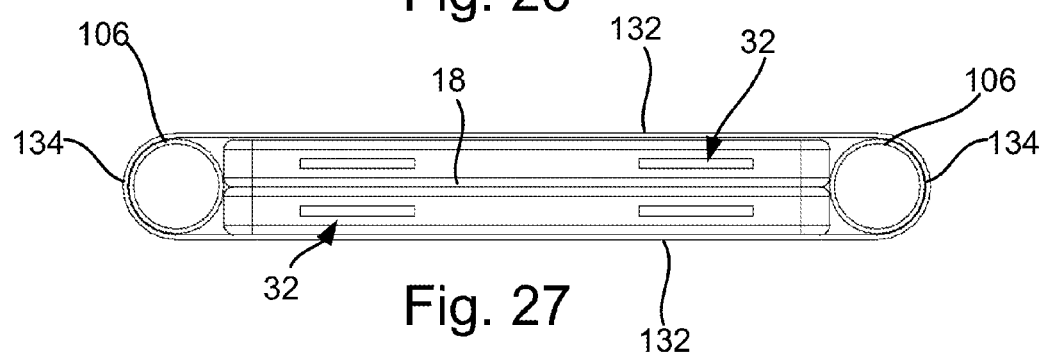
FIG. 27 is a side view of the battery pack of FIG. 26.
Figure 28:
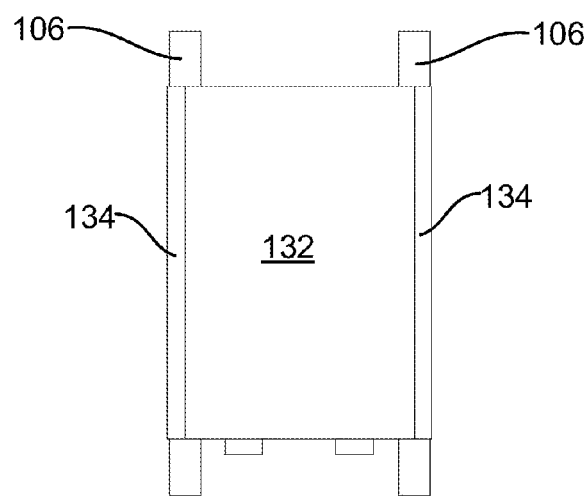
FIG. 28 is a top view of the battery pack of FIG. 26.

With reference now to FIGS. 26-28, where like numbers indicate like elements, a battery pack assembly is shown and generally indicated by the numeral 130. Battery pack assembly 130 includes a pair of cells 32 arranged in a stacked configuration with abutting major surfaces 18. A pair of conduits 106 are positioned on opposed sides of the cells 32, running along the longitudinal length thereof. A heat spreader 36 encompasses cells 32 and a portion of each conduit 106. Heat spreader 36 includes two opposed planar portions 132, each in contact with one of the major surfaces 18 of each battery cell 32. A pair of connecting portions 134 join each planar portion 132, and each wrap around one of the conduits 106. To enable good thermal contact, the outer radius of conduits 106 may advantageously generally match the inner radius of connecting portions 134.

Figure 29:
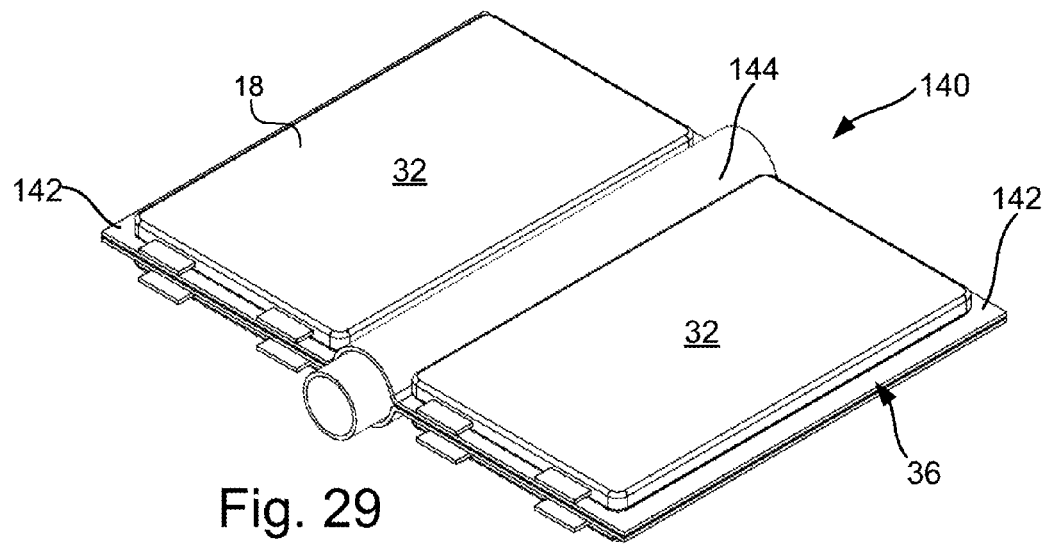
FIG. 29 is an isometric view of another embodiment of a battery pack having a central conduit positioned between two pairs of stacked cells and with a heat spreader positioned between opposed major surfaces of the cells and in thermal contact with the conduit.
Figure 30:
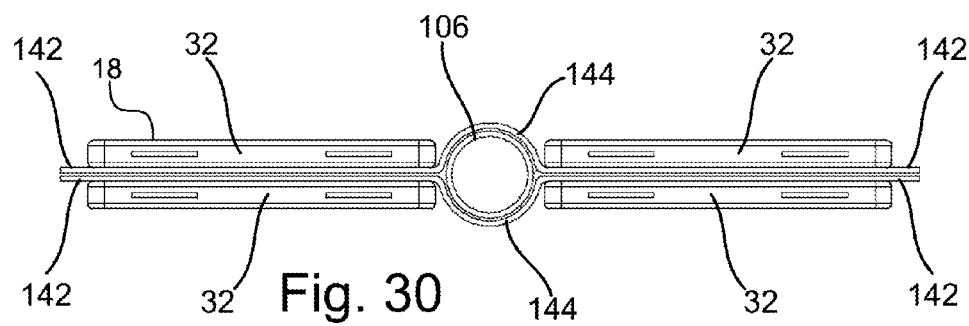
FIG. 30 is a side view of the battery pack of FIG. 29.
Figure 31:
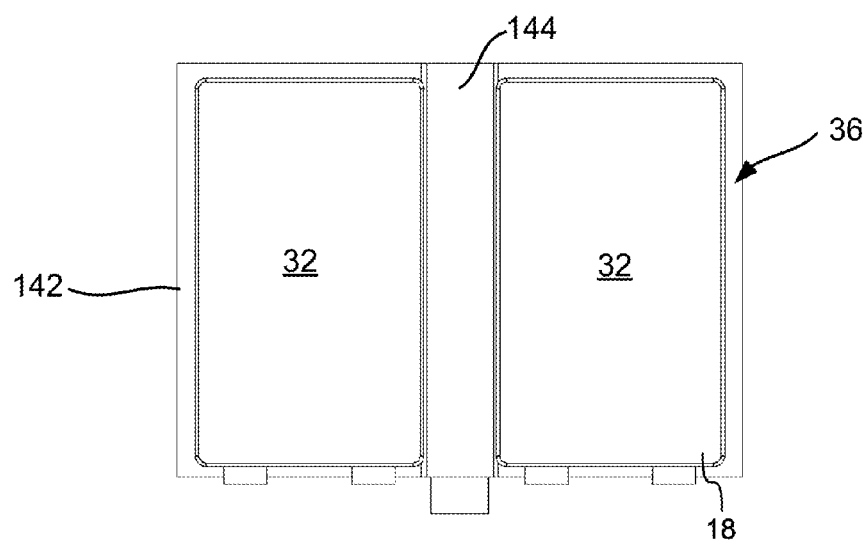
FIG. 31 is a top view of the battery pack of FIG. 29.

With reference now to FIGS. 29-31, where like numbers indicate like elements, a battery pack assembly is shown and generally indicated by the numeral 140. Battery pack assembly 140 includes four (4) battery cells 32 arranged in two pairs positioned on opposing sides of a conduit 106. A pair of heat spreaders 36 are positioned to encompass and contact at least a portion of conduit 106 contact conduit 106 and cells 32. Each heat spreader 36 includes two generally planar portions 142 connected at the center of heat spreader 36 by a curved portion 144. Each planar portion 142 is positioned between the opposed major surfaces 18 two stacked cells 32. Curved portion 144 advantageously may include an inner radius that generally matches the outer radius of the conduit 106. Thus, in the embodiment shown, planar portions 142 each contact the major surface 18 of one cell 32 on one side, and a planar portion of the other heat spreader 36 on the other side.

It should be appreciated, however, that though two heat spreaders are shown in the present embodiment, alternate embodiments may include a single heat spreader 36, wherein each planar portion 142 contacts a major surface of two adjacent cells 32. Still further, it should be appreciated that assembly 140 may be arranged in rows parallel to the major surfaces of the cells 32. According to this embodiment (not shown) a plurality of two-cell stacks may be arranged with conduits interposed between each two-cell stack. In this manner, one or more heat spreaders are positioned to engage each stack and conduit in the manner shown in FIGS. 29-31.

With reference now to FIGS. 32-33, where like numbers indicate like elements, a battery pack assembly is shown and generally indicated by the numeral 150. Assembly 150 includes a thermal transfer block 152 which may include interior channels (not shown) through which a fluid medium is directed. The medium enters at an inlet 154 and exits at an outlet 156. Chilled fluid is directed into inlet 154, which consequently lowers the temperature of thermal transfer block 152 thereby enabling it to act as a heat sink. Block 152 is made of a thermally conductive material such as, for example, a metallic material. For example, block 152 may be made of aluminum, steel, copper, or the like. Further, though the block 152 is shown as a solid article with fluid channels therein, block 152 may alternately take the form of, for example a top flat sheet secured to a bottom corrugated sheet and wherein the cells and heat spreaders are secured to the top flat sheet and the conduits may be run through the spaces formed between the top flat sheet and the bottom corrugated sheet.

A plurality of generally L-shaped heat spreaders 36 are arranged on block 152. A first leg 158 is secured to, and in thermal contact with, the top surface 160 of thermal transfer block 152. A second leg 162 extends upwardly from first leg 158 in a direction generally perpendicular to top surface 160. The spreaders 36 are arranged in a row so that slots 164 are defined between the upwardly extending second legs of adjacent spreaders 36. A cell 32 may be received in each slot 164 so that each major surface 18 of a cell 32 contacts an upwardly extending second leg 162. Though the present embodiment discloses one cell 32 being positioned in each slot 164, it should be appreciated that more than one cell 32 (e.g. two cells) may be positioned within each slot 164.

The junction between first leg 158 and second leg 162 may advantageously include a radius. The radius is advantageously less than about 1 cm, more advantageously less than about 0.5 cm and still further advantageously less than about 1 mm. According to this or other embodiments the heat spreader 36 may include a thin metal foil laminated or otherwise affixed to one major surface. This metal foil layer may be affixed to the block 152 by welding, such as for example, arc welding, tig welding, mig welding, resistance welding, friction welding, ultrasonic welding, laser welding or diffusion bonding. In other embodiments, the laminate may be mechanically fastened to block 152 by, for example, stakes, rivets, screws or the like. In still further embodiments, the laminate may be affixed to the block 152 by adhesive bonding, such as, for example, glues or PSA. Mechanical fastening of the heat spreader may advantageously increase through-plane conductivity at the point of attachment and thus improve thermal transfer from the heat spreader to block 152.

Figure 34:
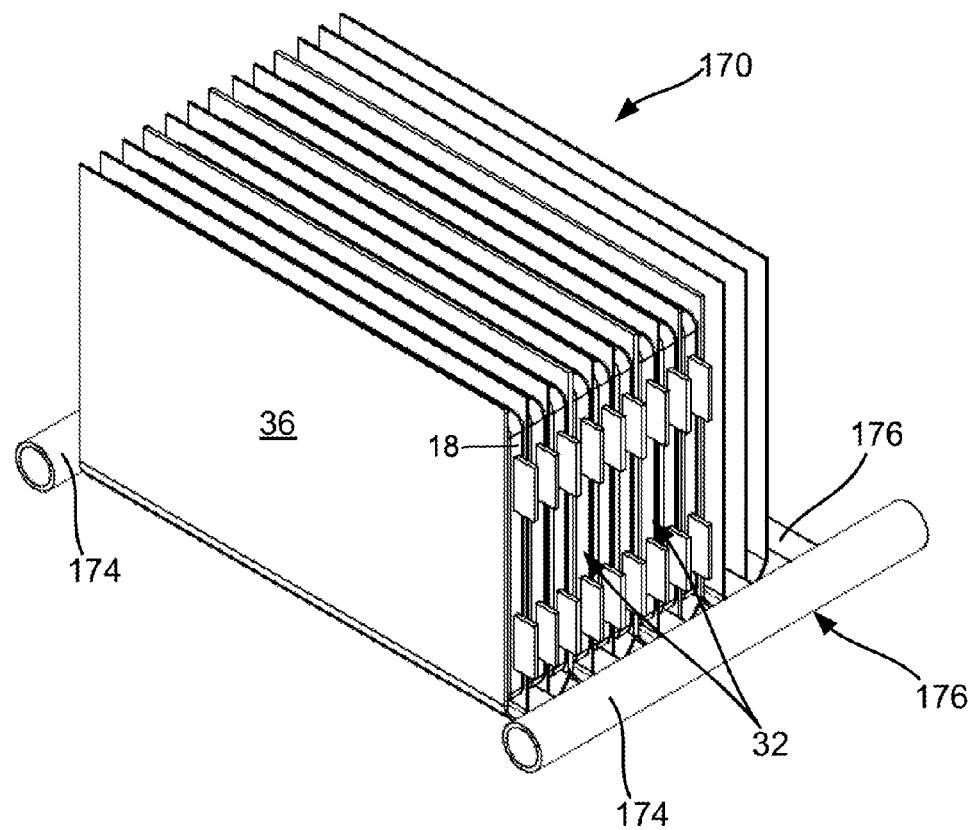
FIG. 34 is an isometric view of another embodiment of a battery pack having a plurality of generally U-shaped heat spreaders and a manifold.
Figure 35:
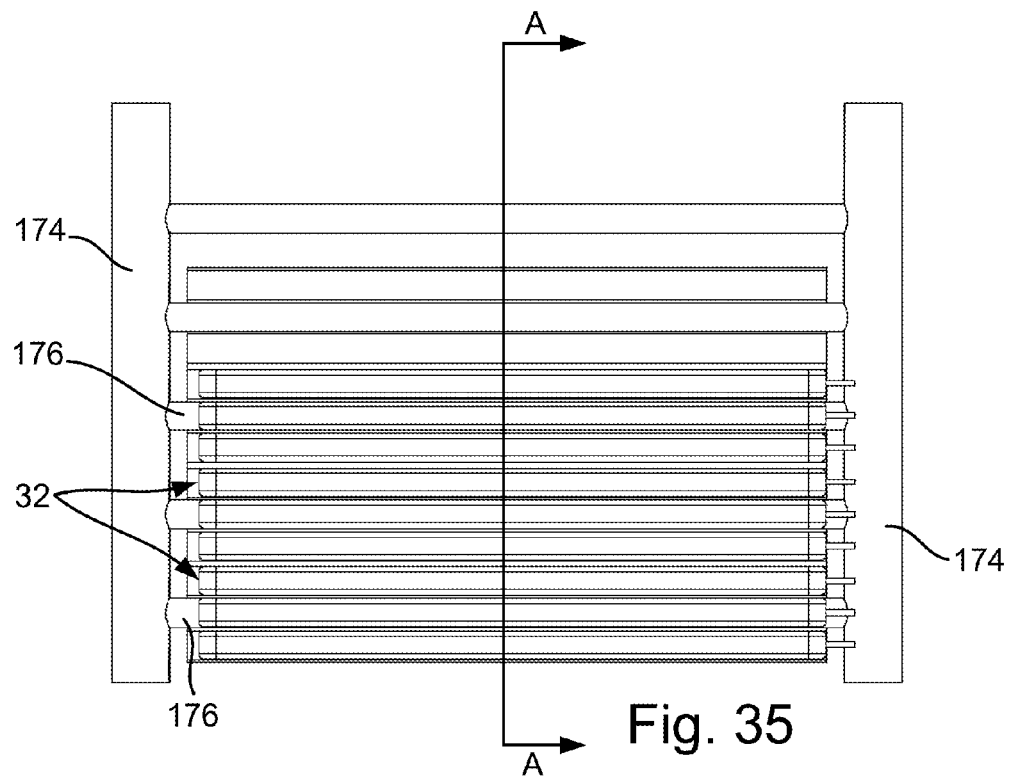
FIG. 35 is a top view of the battery pack of FIG. 34.
Figure 36:
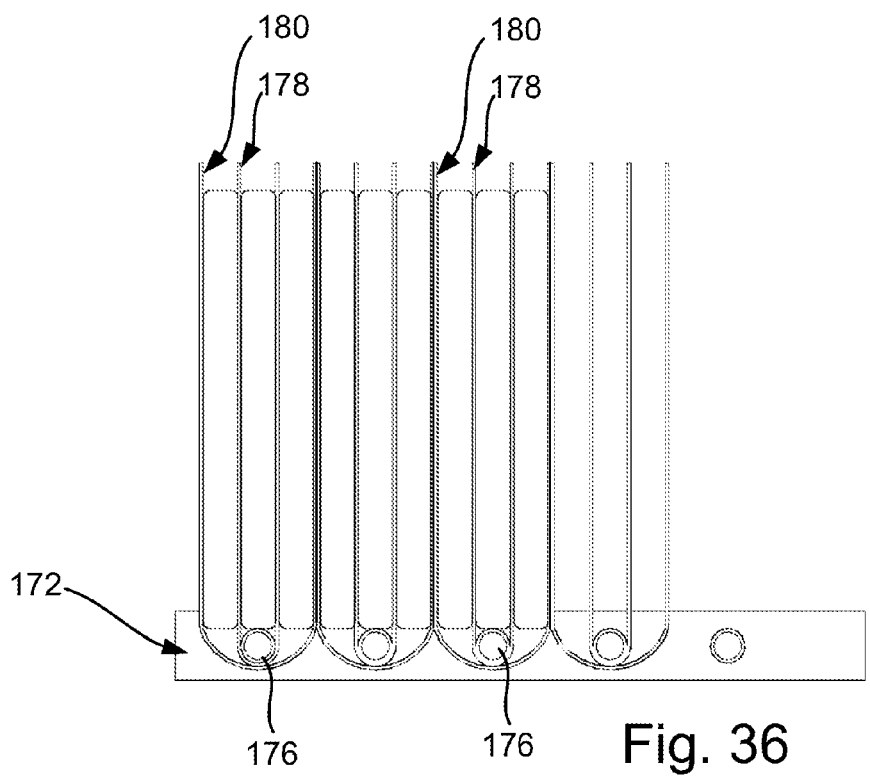
FIG. 36 is a section view taken along line A-A of FIG. 35.

With reference now to FIGS. 34-36, where like numbers indicated like elements, a battery pack assembly is shown and generally indicated by the numeral 170. Battery pack 170 includes a plurality of cells 32 arranged in a contiguous stacked configuration. A plurality of heatspreaders 36 are interspersed between the cells and are in contact with a manifold 172. Manifold 172 includes two primary conduits 174 positioned on opposed sides of the cell stack and through which receive a fluid medium. A plurality of secondary conduits 176 extend between and interconnect the two primary conduits. Thus, a thermal transfer medium may be pumped through the primary and secondary conduits to remove or add thermal energy to the cell stack.

Heatspreaders 36 are generally U-shaped with two heatspreaders provided for every three cells. For each three-cell sub-set, a first heat spreader 178 encompasses one cell 32 (i.e. engages both major surfaces 18 of the cell) and wraps around one of the secondary conduits 176. A second heat spreader 180 encompasses three cells 32 (i.e. engages the two outward facing major surfaces 18 of the three-cell sub-set) and wraps around the secondary conduit and first heat spreader 178. In this manner, the heat generated by the cells may be transferred to the manifold 172 through the two heat spreaders 36.

Figures 37, 38:
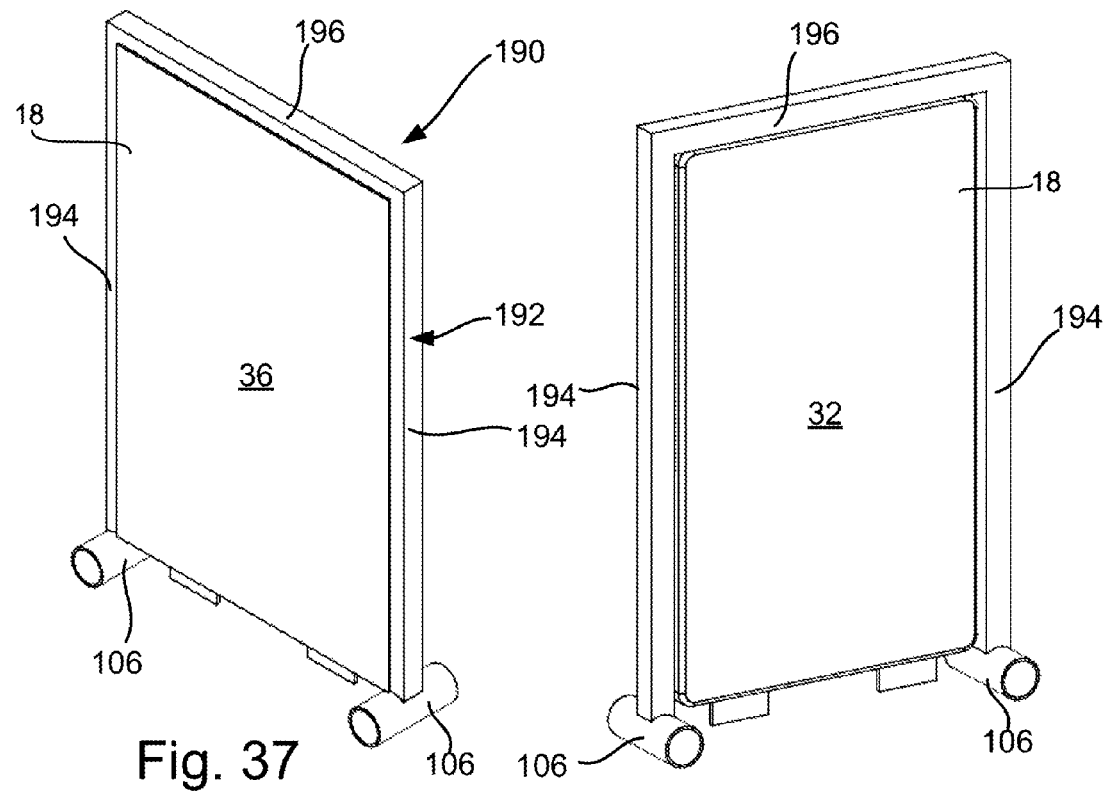
FIG. 37 is an isometric view of another embodiment of a battery pack having an outer hollow frame with a heat spreader secured to one face the frame being in fluid connection with a pair of conduits and shaped to receive a cell therein.
FIG. 38 is a second isometric view of the battery pack of FIG. 37.
Figure 39:
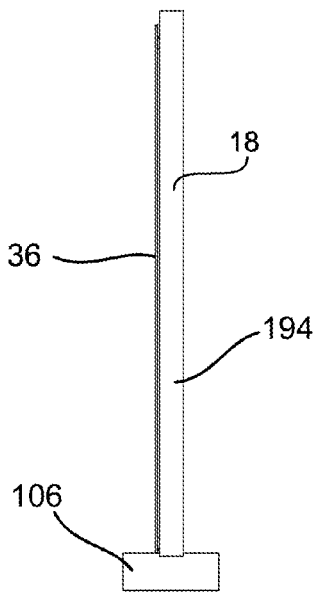
FIG. 39 is a side view of the battery pack of FIG. 37.

With reference now to FIGS. 37-39, where like numbers indicate like elements, a battery assembly is shown and indicated by the numeral 190. Battery assembly 190 includes an outer hollow frame 192 that is sized to receive a cell 32 therein. Hollow frame 192 includes two spaced side legs 194 that, at one end connect to a top leg 196 and at the opposed ends each connect to a conduit 106 located on opposed sides of the cell 32. A thermal transfer medium may be pumped through conduits 196 and consequently through the hollow frame 192.

A heatspreader 36 is secured to one side of hollow frame 192 and in thermal contact with advantageously at least two legs and even more advantageously all three legs 194 and 196. One major surface 18 of the cell 32 is in thermal contact with the heatspreader 36. In this manner, heat is transferred from cell 32 to frame 192. Further, frame 192 may provide added structural integrity and provide a reinforcing function to protect and carry the cell 32 therein.

It should be appreciated that, though only a single cell is shown, multiple assemblies 190 may be arranged in a stacked configuration along conduits 196. Further, though only a single heat spreader 36 is shown, it should be appreciated that a second heat spreader may be provided on the side of frame 192 opposed to the side wherein the first heat spreader is provided and in thermal contact with the other major surface of cell 32. According to this embodiment, the cell 32 is positioned in the volume defined by the two heat spreaders 36 and the frame 192.

Figure 40:
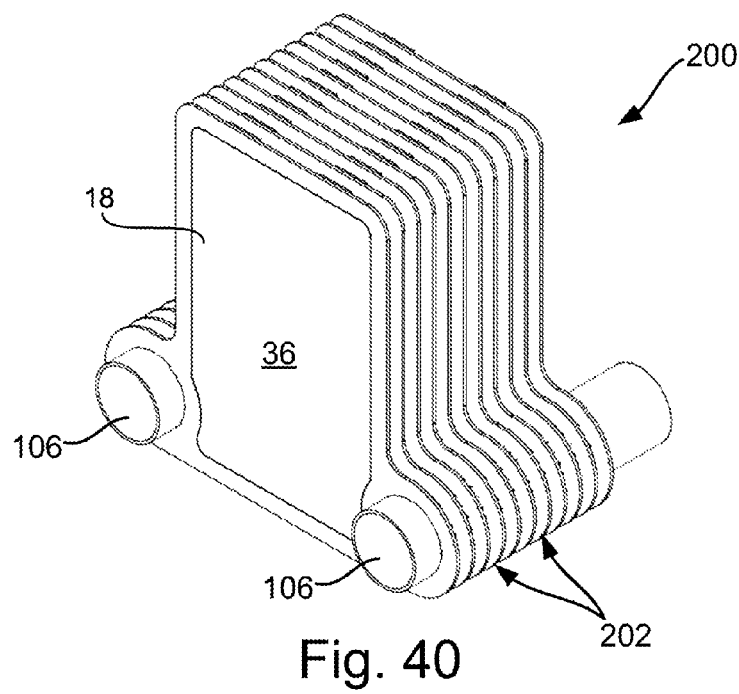
FIG. 40 is an isometric view of another embodiment of a battery pack having a plurality of plates having heat spreaders secured thereto and with cells positioned between the plates.
Figure 41:
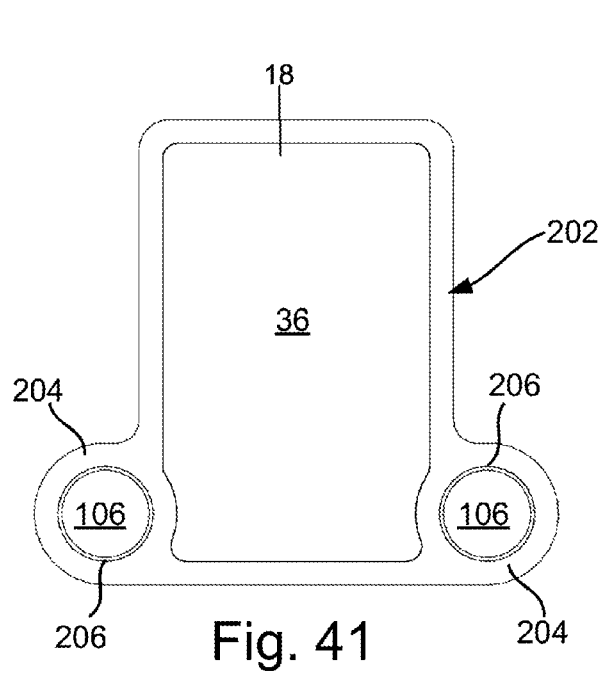
FIG. 41 is a front view of the battery pack of FIG. 40.
Figure 42:
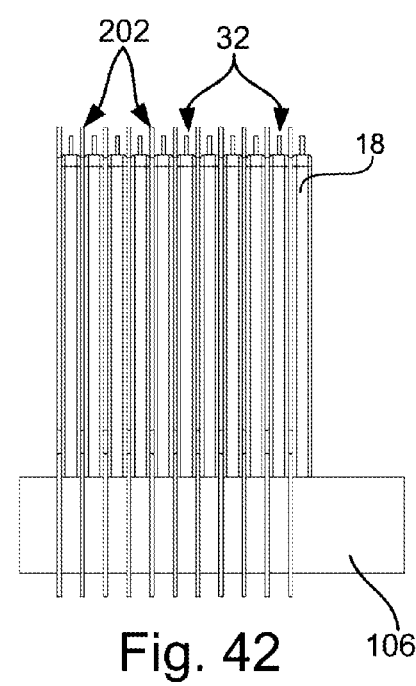
FIG. 42 is a side view of the battery pack of FIG. 40.

With reference now to FIGS. 40-42, where like numbers indicate like elements, a battery pack assembly is shown and generally indicated by the numeral 200. Battery pack 200 includes a plurality of cells 32 arranged in a stacked configuration. Interposed between each cell 32 is a mounting plate 202. Mounting plate 202 may be sized and shaped to approximate the profile of a cell 32. In one embodiment, mounting plate is made of a metal material. In one embodiment the mounting plate material has a thermal conductivity less than about 350 W/m-K. In other embodiments, the mounting plate is made from a material having a thermal conductivity less than about 250 W/m-K. In still other embodiments the mounting plate material has a thermal conductivity of less than about 150 W/m-K.

Secured to one or both major surfaces of the mounting plate 202 is a heat spreader 36 which may generally approximate the shape and area of the major surface 18 of the cell 32. Mounting plate 202 further includes a pair of extensions 204 on opposed sides of the cell 32. Each extension 204 includes an aperture 206 through which is received a conduit 106. As discussed above, a thermal transfer medium may be pumped through conduit 106. It should further be appreciated that tubes 106, may serve as a reinforcing members that hold the stack and mounting plates together.

Figure 43:
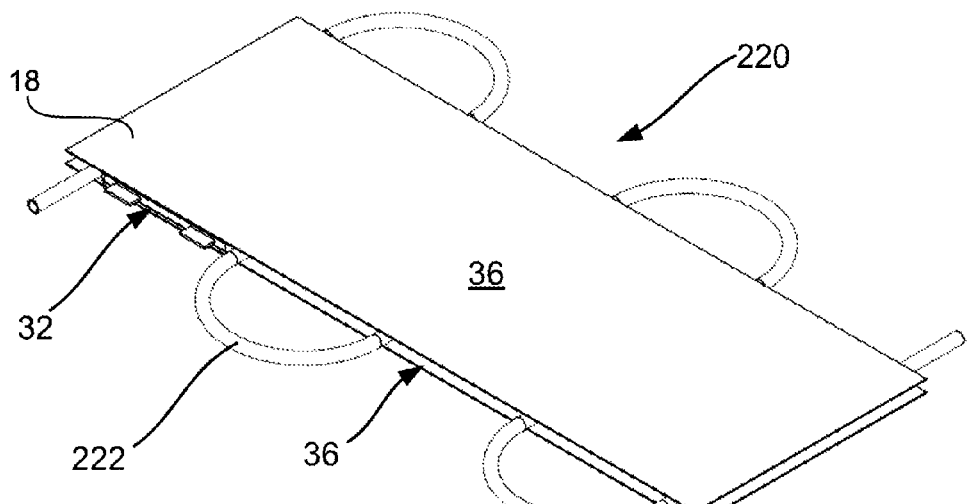
FIG. 43 is an isometric view of another embodiment of a battery pack having a plurality of cells arranged side-by-side and a serpentine conduit interweaved therebetween, the cells including heat spreaders positioned in contact with both major surfaces.
Figure 44:
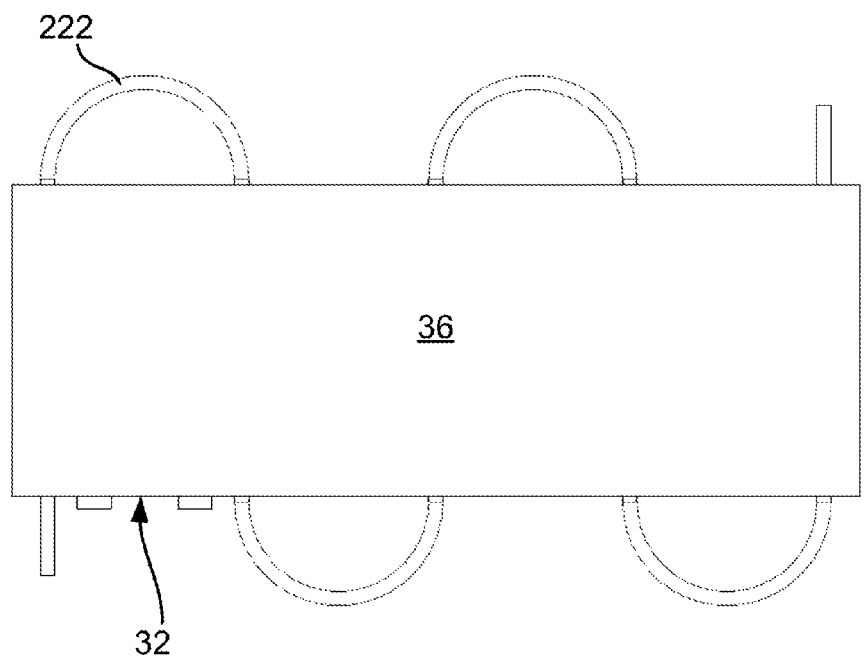
FIG. 44 is a top view of the battery pack of FIG. 43.

With reference now to FIGS. 43-44, where like numerals indicate like elements, a battery pack assembly is shown and generally indicated by the numeral 220. Battery pack 220 may include a plurality of cells 32 (only one shown for clarity) arranged side-by-side in a contiguous row. Interposed between each cell 32 is a conduit 222 which is generally serpentine in shape. A pair of heat spreaders 36 are positioned to each engage one of the major surfaces 18 of the cells 32 as well as the serpentine conduit 222. Heat spreaders 36 advantageously span the entire contiguous row of cells 32. A thermal transfer medium may be pumped through conduit 222.

In one or more of the above embodiments, it should be appreciated that conduits are provided to actively remove or add thermal energy to the system. Thus, the conduits are advantageously made of a thermally conductive material such as, for example, metal. Exemplary metals may include aluminum, brass, copper, and stainless steel.

Each conduit may provide a continuous flow of a thermal transfer medium into and out of the system to remove or add thermal energy thereto. In other embodiments, the flow of thermal transfer medium is temperature dependent whereby, for example, as the temperature in one or more cells increases, the flow of thermal transfer medium increases. In these or other embodiments, the thermal transfer medium, may be cooled or heated as needed once it leaves the assembly and then re-circulated back to the assembly to thereby cool or heat the assembly.

Each spreader 36 of the above embodiments is optionally thin and sheet-like, having two opposed major surfaces. In one embodiment, the heat spreader 36 may be less than about 2 mm thick. In other embodiments the heat spreader 36 may be less than about 1 mm thick. In still other embodiments, the heat spreader may be less than about 0.5 mm thick. According to one or more embodiments, heat spreader 36 may be a sheet of a compressed mass of exfoliated graphite particles, a sheet of graphitized polyimide or combinations thereof.

Where a heat spreader 36 includes multiple portions (i.e. curved and straight portions or first and second legs) it should be appreciated that the heat spreader 36 may be a single contiguous sheet. In other embodiments the heat spreader may be multiple sheets joined together as by, for example, thermal adhesive, mechanical fasteners or other means.

Each heat spreader 36 may have an in-plane thermal conductivity of greater than about 250 W/mK at about room temperature (using the Angstrom method to test at room temperature being approximately 25° C.). In another embodiment the in-plane thermal conductivity of spreader 36 is at least about 400 W/mK. In yet a further embodiment, the in-plane thermal conductivity of spreader 36 may be at least about 550 W/mK. In additional embodiments, the in-plane thermal conductivity may range from at least 250 W/mK to at least about 1500 W/mK. It is further preferred that at least one of the spreaders has an in-plane thermal conductivity of at least about twice the in-plane thermal conductivity of aluminum. Furthermore, each spreader 36 may have the same or different in-plane thermal conductivities. Any combination of the above in-plane thermal conductivities may be practiced. In one embodiment, the graphite sheet material may be from 10 to 1500 microns thick. In other embodiments the graphite sheet material may be from 20 to 40 microns thick. Suitable graphite sheets and sheet making processes are disclosed in, for example, U.S. Pat. Nos. 5,091,025 and 3,404,061, the contents of which are incorporated herein by reference.

In an optional embodiment, one or more spreaders 36 may be resin reinforced. The resin may be used, for example, to improve the rigidity of the spreader 36 and/or the impermeability of spreader 36. In combination with resin reinforcement, or in the alternative, one or more spreaders 36 may include carbon and/or graphite fiber reinforcement. Preferably, spreader 36 may include a sufficient amount of reinforcement to assist with or provide structural integrity to battery pack 30.

Spreader 36 is a more conformable material than conventional materials used in a pack for heat spreading (ex. aluminum). Use of spreader 36 offers a reduction in interfacial thermal heat transfer resistance between spreader 36 and cell 32 as compared to cell 32 and a conventional material for the spreader. Because spreader 36 is more conformable, interfacial thermal heat transfer between cells 32 having non-flat major surfaces is better than conventional spreaders. The conformability and the resulting reduction in interfacial thermal heat transfer resistance can reduce or even eliminate the need to apply a thermally conductive grease or paste to the surface of the spreader 36, as is commonly practiced to overcome the interfacial resistance of conventional spreader materials.

If inter-cell electrical isolation is desired, spreader 36 may optionally be coated with an electrically insulating film on one or both major surfaces, wherein the film is substantially thin enough not to appreciably impede heat transfer to the spreader 36. Exemplary films include PET and polyimide films.

Spreader 36 may optionally be coated with a film adhesive on one or both major surfaces, wherein the adhesive layer is thin enough not to appreciably impede heat transfer to the spreader. The use of spreaders 36 incorporating an adhesive layer and supplied on a release liner can simplify the assembly of the battery pack by enabling "peel and stick" application to individual battery cells. Additionally, battery packs assembled with spreader 36 incorporating the film adhesive can reduce or substantially eliminate the need for potting compounds (such as silicone or polyurethane) used to prevent cells from shifting under inertial forces and vibration, as is commonly practiced in battery pack constructions incorporating conventional spreader materials.

In any of the above embodiments, at least one of the spaces between adjacent heat spreaders 36 or between the heat spreader 36 and an adjacent cell 32 may be at least partially filled with a layer of a phase change material. In another embodiment at least one of the spaces between adjacent heat spreaders 36 or between the heat spreader 36 and an adjacent cell 32 is completely filled with a layer of a phase change material. In these or other embodiments, substantially all of the spaces between the heat spreaders 36 or between the heat spreaders 36 and the adjacent cells 32 includes a phase change material. The phase change material may be free flowing and contained or bound at least partially by the heat spreaders. Alternately, the phase change material may be physically adsorbed into a carrying matrix. For example, the phase change material may be absorbed and carried in a compressed expanded graphite mat or carbon foam. The phase change material would help reduce the magnitude and speed of temperature changes in the battery pack. The melting temperature range of the phase change material may advantageously be approximately equal to the recommended operating temperature range for the battery cells within the battery pack. An example of a suitable phase change material is a paraffin wax.

In any one or more of the above embodiments, the heat spreader 36 may further be a composite material. For example, each heat spreader may include a pair of graphite sheets having a phase change material disposed therebetween. The phase change material may be free flowing and contained or bound by the graphite sheets. Alternately, the phase change material may be physically adsorbed into a carrying matrix that is positioned between the opposed graphite sheets. For example, the phase change material may be absorbed and carried in a compressed expanded graphite mat or carbon foam. In the alternative, the composite material may include a single graphite sheet layer secured to a single carrying matrix layer having the phase change material absorbed therein. In still other embodiments, heat spreader 36 may include a single layer of graphite sheet material having the phase change material absorbed therein.

In a further embodiment, one or more of the spreaders 36 may be attached to a rigid support member (not shown). The rigid support may function to provide structural integrity to the battery pack. The rigid support may be constructed from metal, plastic, a composite material, or a laminate of any of the foregoing materials. In a further embodiment, one or more of the rigid support members may be attached to heat sinks, thermal transfer blocks, or conduits to support the battery pack. Different embodiments of the rigid support member may include a sheet like member or a frame. In the form of a sheet, rigid support member may have dimensions substantially similar to that of the spreader. As for the frame version of the rigid support member, the frame should engage at least one side, more preferably at least two sides of a spreader 36.

In a further embodiment, battery pack 30 may include "n" number of graphite heat spreaders 36 and in addition to spreaders 36, battery pack 30 may include either n+1 aluminum heat spreaders or n−1 aluminum heat spreaders. Preferably at least one, more preferably each, aluminum heat spreader is in thermal communication with one or more heat sinks 34a and/or 34b and at least two lithium polymer cells 32. It is further preferred that each aluminum heat spreader is not disposed in the same location as each graphite heat spreader 36. In an alternate embodiment of the above, pack 30 includes not more that one (1) aluminum heat spreader.

In a further optional embodiment, one or more of spreaders 36 may include one or more embossed surfaces. In a certain embodiment, the embossed surface includes a plurality of transverse fluid channels across a major surface of spreader 36. In another embodiment, one or more of spreaders 36 include a plurality of internal fluid channels. Preferably the fluid channels transverse from one end of spreader 36 to an opposed end of spreader 36. The fluid channels of spreader 36 are optionally configured in one of a straight, serpentine, or branched flow path. In a further embodiment, the fluid channels of spreader(s) 36 are in communication with the fluid channels of the heat sink, thermal transfer plate or conduit. Typical methods of forming spreader 36 may include compression molding, embossing, and/or an adiabatic forming process.

Packs made in accordance with the embodiments described herein reduce the weight of their thermal management system by at least at least about 20%, preferably up to about 50% or more as compared packs made with conventional heat spreaders. Additionally, battery packs made in accordance with the description will have reduced hot spot issues when compared to convention packs. Furthermore packs made in accordance with the disclosure may exhibit a reduction in overall size due a reduction in thickness of the pack as compared to cells that use traditional thermal management materials.

Also, embodiments of a pack disclosed herein may include one or more of the following advantages as compared to conventional packs: improved thermal diffusivity, heat up more quickly, cool down more quickly, lower interfacial resistance, lower system cost, lower system weight, lower system volume, lower parasitic power, lower part count, faster charge/discharge, and faster cold startup.

The disclosures of all cited patents and publications referred to in this application are incorporated herein by reference in their entirety.

The various embodiments disclosed herein may be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A thermal management assembly for a battery pack having opposed major surfaces, the thermal management assembly comprising:
   a flexible graphite heat spreader having two opposed major surface feces and an in-plane thermal conductivity of at least 300 W/m–K;
   a first conduit through which a fluid flows; and
   wherein at least one of said two opposed major surface faces of said flexible graphite heat spreader contacts at least a portion of one of the opposed major surfaces' of a battery cell of said battery pack and the flexible graphite heat spreader having a center segment comprising a curved portion, the curved portion having an inner radius matching an outer radius of a portion of the outer surface of the first conduit, the curved portion contacts the portion of the outer surface of the first conduit, at least one of said two opposed major surface faces of said flexible graphite heat spreader contacts both said opposed major surfaces of said battery cell.

2. The thermal management assembly of claim 1 wherein said flexible graphite heat spreader having a U-shape.

3. The thermal management assembly of claim 1 wherein said battery cell comprises a prismatic battery.

4. The thermal management assembly of claim 1 further comprising a plurality of battery cells in a stacked configuration and said flexible graphite heat spreader contacting at least one of said major surfaces of at least two battery cells.

5. The thermal management assembly of claim 1 further comprising a plurality of battery cells arranged in a stacked configuration and a second conduit, wherein said flexible graphite heat spreader contacts at least one major surface of at least two battery cells and further contacts at least a portion of the second conduit.

6. The thermal management assembly of claim 1 wherein the flexible graphite heat spreader comprises a sheet of compressed particles of exfoliated graphite.

7. The thermal management assembly of claim 1 wherein the flexible graphite heat spreader comprises a sheet of graphitized polyimide.

* * * * *